(12) United States Patent
Aiso et al.

(10) Patent No.: US 10,618,181 B2
(45) Date of Patent: Apr. 14, 2020

(54) ROBOT CONTROL DEVICE, ROBOT, AND ROBOT SYSTEM

(71) Applicant: Seiko Epson Corporation, Tokyo (JP)

(72) Inventors: Seiji Aiso, Shiojiri (JP); Nobuyuki Setsuda, Okaya (JP); Kentaro Tsukamoto, Azumino (JP)

(73) Assignee: Seiko Epson Corporation (JP)

( * ) Notice: Subject to any disclaimer, the term of this patent is extended or adjusted under 35 U.S.C. 154(b) by 231 days.

(21) Appl. No.: 15/689,439

(22) Filed: Aug. 29, 2017

(65) Prior Publication Data

US 2018/0056523 A1  Mar. 1, 2018

(30) Foreign Application Priority Data

Aug. 31, 2016  (JP) .................................. 2016-168976

(51) Int. Cl.

| | |
|---|---|
| B25J 9/16 | (2006.01) |
| B25J 15/02 | (2006.01) |
| G05B 19/418 | (2006.01) |
| G06F 9/00 | (2006.01) |
| G06F 11/00 | (2006.01) |

(52) U.S. Cl.
CPC ............. B25J 15/02 (2013.01); B25J 9/1697 (2013.01); G05B 19/41845 (2013.01); G05B 2219/31264 (2013.01); G05B 2219/39163 (2013.01); G05B 2219/40004 (2013.01); G05B 2219/45063 (2013.01); G06F 9/00 (2013.01); G06F 11/00 (2013.01); Y02P 90/265 (2015.11)

(58) Field of Classification Search
USPC .................................................. 700/245–264
See application file for complete search history.

(56) References Cited

U.S. PATENT DOCUMENTS

| | | | |
|---|---|---|---|
| 7,177,459 B1 * | 2/2007 | Watanabe .............. | B25J 9/1697 382/151 |
| 9,089,966 B2 * | 7/2015 | Domae .................. | B25J 9/1612 |
| 9,102,055 B1 * | 8/2015 | Konolige ................ | B25J 9/163 |
| 9,205,559 B2 * | 12/2015 | Kawanami ............ | B25J 9/1669 |

(Continued)

FOREIGN PATENT DOCUMENTS

| | | | | |
|---|---|---|---|---|
| EP | 2263837 A1 * | 12/2010 | ............ | B25J 9/1612 |
| JP | 08-112727 A | 5/1996 | | |

(Continued)

OTHER PUBLICATIONS

Extended European Search Report for EP Application No. 17188748.2, dated Mar. 7, 2018; 11 pages.

*Primary Examiner* — Jonathan L Sample
(74) *Attorney, Agent, or Firm* — Harness, Dickey & Pierce, P.L.C.

(57) ABSTRACT

On the basis of received first region information indicating a first region, which is a region designated for an acquired picked-up image of a plurality of target objects, and second region information indicating a second region different from the first region, a robot control device causes a robot to grip the target object for which the second region not overlapping the first region of another of the target objects is designated and does not cause the robot to grip the target object, the second region for which overlaps the first region of the other target object.

20 Claims, 17 Drawing Sheets

(56) References Cited

U.S. PATENT DOCUMENTS

| | | | |
|---|---|---|---|
| 2006/0104788 A1* | 5/2006 | Ban | B25J 9/1697 414/729 |
| 2010/0092032 A1* | 4/2010 | Boca | B25J 9/1679 382/103 |
| 2012/0029686 A1* | 2/2012 | Ban | B25J 9/1679 700/218 |
| 2012/0059517 A1* | 3/2012 | Nomura | B25J 9/1612 700/259 |
| 2012/0158180 A1* | 6/2012 | Iio | B25J 9/1679 700/259 |
| 2013/0158710 A1* | 6/2013 | Oda | B25J 9/1697 700/259 |
| 2013/0184870 A1* | 7/2013 | Ota | B25J 9/1669 700/262 |
| 2013/0211593 A1* | 8/2013 | Domae | B25J 9/1697 700/258 |
| 2013/0238124 A1* | 9/2013 | Suzuki | B25J 9/16 700/250 |
| 2013/0238125 A1* | 9/2013 | Suzuki | B25J 9/1612 700/253 |
| 2013/0266205 A1* | 10/2013 | Valpola | G06K 9/78 382/153 |
| 2013/0338826 A1* | 12/2013 | Lukka | G06T 7/70 700/245 |
| 2014/0067126 A1* | 3/2014 | Watanabe | B25J 9/1697 700/259 |
| 2014/0121836 A1* | 5/2014 | Ban | B25J 9/0093 700/259 |
| 2015/0003678 A1* | 1/2015 | Watanabe | B25J 9/1697 382/103 |
| 2015/0124057 A1* | 5/2015 | Yamazaki | B25J 9/1697 348/46 |
| 2015/0127161 A1* | 5/2015 | Satou | B25J 9/1612 700/259 |
| 2015/0127162 A1* | 5/2015 | Gotou | B25J 9/1612 700/259 |
| 2015/0217451 A1* | 8/2015 | Harada | B25J 9/1612 700/253 |
| 2015/0224650 A1* | 8/2015 | Xu | B25J 15/0608 700/213 |
| 2015/0246778 A1* | 9/2015 | Koga | B25J 9/1697 700/259 |
| 2016/0016311 A1* | 1/2016 | Konolige | B25J 5/007 700/245 |
| 2016/0059419 A1* | 3/2016 | Suzuki | B25J 9/1697 700/114 |
| 2016/0229061 A1* | 8/2016 | Takizawa | B25J 9/1694 |
| 2016/0253562 A1* | 9/2016 | Yuki | B25J 9/1679 382/153 |
| 2016/0279809 A1* | 9/2016 | Nakajima | B25J 9/1697 |
| 2016/0304281 A1* | 10/2016 | Elazary | B25J 15/0616 |
| 2017/0028561 A1* | 2/2017 | Yamada | B25J 9/1697 |
| 2017/0355078 A1* | 12/2017 | Ur | B25J 9/1612 |
| 2018/0308192 A1* | 10/2018 | Hayashi | B25J 9/1697 |
| 2018/0370038 A1* | 12/2018 | Isaac | B25J 19/023 |

FOREIGN PATENT DOCUMENTS

| | | |
|---|---|---|
| JP | 2002-113678 A | 4/2002 |
| JP | 2013-184273 A | 9/2013 |
| JP | 5558585 B2 | 7/2014 |

* cited by examiner

|  | TARGET OBJECT P1 | TARGET OBJECT P2 | TARGET OBJECT P3 | TARGET OBJECT P4 | TARGET OBJECT P5 | TARGET OBJECT P6 | TARGET OBJECT P7 |
|---|---|---|---|---|---|---|---|
| ASSOCIATED WITH THIRD REGION NOT OVERLAPPING THIRD REGION ASSOCIATED WITH ANOTHER TARGET OBJECT P | YES | NO | NO | NO | NO | NO | NO |
| FOURTH REGION ASSOCIATED WITH ANOTHER OBJECT P IS ASSOCIATED WITH THIRD REGION NOT OVERLAPPING THIRD REGION | YES | NO | NO | NO | NO | NO | NO |

FIG. 9

ROBOT CONTROL DEVICE, ROBOT, AND ROBOT SYSTEM

BACKGROUND

1. Technical Field

The present invention relates to a robot control device, a robot, and a robot system.

2. Related Art

There have been performed researches and developments of a technique for causing a robot to perform work on the basis of a picked-up image picked up by an image pickup section.

Concerning the technique, there is known a tracking method for picking up, in a predetermined image pickup region, images of a plurality of target objects conveyed by a conveying body, acquiring position coordinates and directions of the target objects from a result of the image pickup, acquiring a moving distance of the conveying body, and moving and rotating a gripper, which grips the plurality of target objects, on the basis of the position coordinates and the directions and the moving distance to thereby control handling of the plurality of target objects in a predetermined movable region, the tracking method calculating moving times from the position of the griper to the target objects taking into account rotation times from an angle of the gripper to angles for enabling handling of the target objects, setting the calculated moving times of the gripper as handling times, and determining handling order of the target objects in the predetermined movable region in order from the target object having the shortest handling time (see JP-A-2002-113678 (Patent Literature 1)).

However, in the tracking method described in Patent Literature 1, when another target object is adjacent to a target object to be gripped, in some case, the gripper comes into contact with the other target object and the gripper and the other target object are deformed.

SUMMARY

An aspect of the invention is directed to a robot control device that, on the basis of received first region information indicating a first region, which is a region designated for an acquired picked-up image of a plurality of target objects, and second region information indicating a second region different from the first region and corresponding to the first region, causes a robot to grip the target object for which the second region not overlapping the first region of another of the target objects is designated and does not cause the robot to grip the target object, the second region for which overlaps the first region of the other target object.

With this configuration, on the basis of the received first region information indicating the first region, which is the region designated for the acquired picked-up image of the plurality of target objects, and the second region information indicating the second region different from the first region and corresponding to the first region, the robot control device causes the robot to grip the target object for which the second region not overlapping the first region of another of the target objects is designated and does not cause the robot to grip the target object, the second region for which overlaps the first region of the other target object. Consequently, the robot control device can cause the robot to grip the target object that satisfies a condition desired by an operator.

As another aspect of the invention, the robot control device may be configured such that, on the basis of the first region information, the robot control device causes the robot to grip the target object for which the first region not overlapping the first region designated for the other object is designated and does not cause the robot to grip the target object for which the first region overlapping the first region designated for the other target object is designated.

With this configuration, on the basis of the first region information, the robot control device causes the robot to grip the target object for which the first region not overlapping the first region designated for the other target object is designated and does not cause the robot to grip the target object for which the first region overlapping the first region designated for the other target object is designated. Consequently, on the basis of the first region associated with the target object, the robot control device can cause the robot to grip the target object that satisfies a condition desired by the operator.

As another aspect of the invention, the robot control device may be configured such that the second region is set according to the designation of the first region.

With this configuration, in the robot control device, the second region is set according to the designation of the first region. Consequently, the robot control device can assist the setting of the second region.

As another aspect of the invention, the robot control device may be configured such that the second region is designated by received operation.

With this configuration, in the robot control device, the second region is designated by the received operation. Consequently, on the basis of the set second region, the robot control device can cause the robot to grip the target object that satisfies a condition desired by the operator.

As another aspect of the invention, the robot control device may be configured such that, the robot control device sets, on the basis of the first region information and the second region information, a third region corresponding to the first region and a fourth region corresponding to the second region in the image of at least a part of the plurality of target objects and causes a display section to display the third region and the fourth region and at least the part of the target objects for which the third region and the fourth region are set.

With this configuration, the robot control device sets, on the basis of the first region information and the second region information, the third region corresponding to the first region and the fourth region corresponding to the second region in the image of at least a part of the plurality of target objects and causes the display section to display the third region and the fourth region and at least the part of the target objects for which the third region and the fourth region are set. Consequently, the robot control device can assist the operator in designating the first region and the second region in the target object.

As another aspect of the invention, the robot control device may be configured such that the robot control device causes a display section to display the first region indicated by the first region information and the second region indicated by the second region information and the image of the target object.

With this configuration, the robot control device causes the display section to display the first region indicated by the first region information and the second region indicated by the second region information and the image of the target object. Consequently, the robot control device can assist the operator in associating the first region and the second region with the target object.

As another aspect of the invention, the robot control device may be configured such that the first region is a region including an entire contour of the target object and is a region based on a shape of the target object.

With this configuration, in the robot control device, the first region is the region including the entire contour of the target object and is the region based on the shape of the target object. Consequently, on the basis of the first region including the entire target object, the robot control device can cause the robot to grip the target object that satisfies a condition desired by the operator.

As another aspect of the invention, the robot control device may be configured such that a shape of the first region is a convex hull.

With this configuration, in the robot control device, the shape of the first region is the convex hull. Consequently, on the basis of a first region corresponding to the first region having the convex hull shape, the robot control device can cause the robot to grip the target object that satisfies a condition desired by the operator.

As another aspect of the invention, the robot control device may be configured such that the second region is a region concerning the gripping of the target object by the robot.

With this configuration, in the robot control device, the second region is the region concerning the gripping of the target object by the robot. Consequently, on the basis of the second region concerning the gripping, the robot control device can cause the robot to grip the target object that satisfies a condition desired by the operator.

Another aspect of the invention is directed to a robot that operates on the basis of control by the robot control device according to the aspect explained above.

With this configuration, the robot grips the target object on the basis of the first region and the second region. Consequently, the robot can grip the target object that satisfies a condition desired by the operator.

Another aspect of the invention is directed to a robot system including: the robot control device according to the aspect explained above; and the robot according to the aspect explained above.

With this configuration, the robot system causes the robot to grip the target object on the basis of the first region and the second region. Consequently, the robot system can causes the robot to grip the target object that satisfies a condition desired by the operator.

As explained above, on the basis of the received first region information indicating the first region, which is the region designated for the acquired picked-up image of the plurality of target objects, and the second region information indicating the second region different from the first region and corresponding to the first region, the robot control device causes the robot to grip the target object for which the second region not overlapping the first region of another of the target objects is designated and does not cause the robot to grip the target object, the second region for which overlaps the first region of the other target object. Consequently, the robot control device can cause the robot to grip the target object that satisfies a condition desired by the operator.

On the basis of the received first region information indicating the first region, which is the region designated for the acquired picked-up image of the plurality of target objects, and the second region information indicating the second region different from the first region and corresponding to the first region, the robot and the robot system grip the target object for which the second region not overlapping the first region of another of the target objects is designated and do not grip the target object, the second region for which overlaps the first region of the other target object. Consequently, the robot can grip the target object that satisfies a condition desired by the operator.

BRIEF DESCRIPTION OF THE DRAWINGS

The invention will be described with reference to the accompanying drawings, wherein like numbers reference like elements.

FIG. 9 is a table showing an example of the target objects that the robot control device causes a robot to grip.

DESCRIPTION OF EXEMPLARY EMBODIMENTS

Embodiment

An embodiment of the invention is explained below with reference to the drawings.

Configuration of a Robot System

First, the configuration of a robot system 1 is explained.

Figure 1:
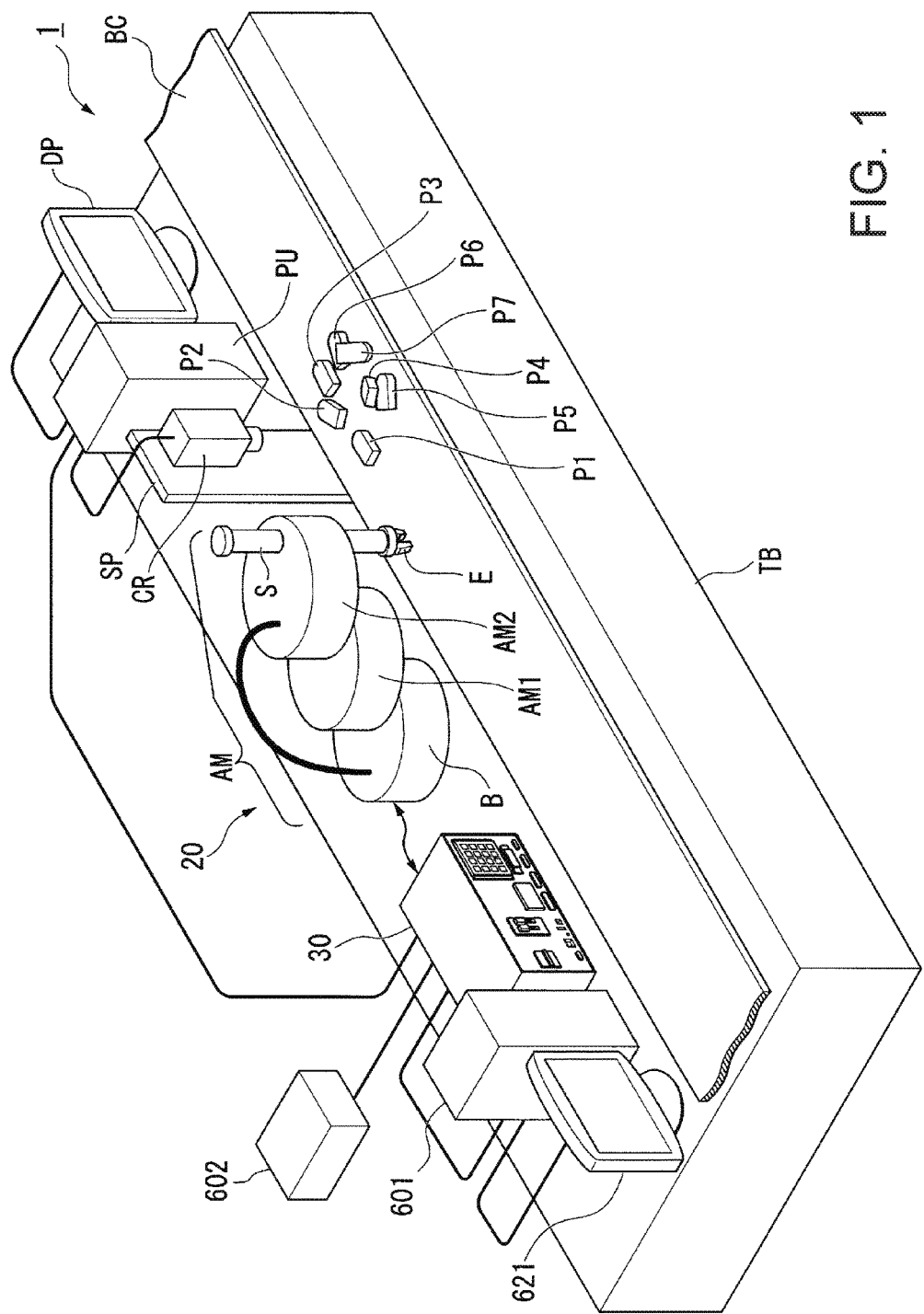
FIG. 1 is a diagram showing an example of the configuration of a robot system according to an embodiment.

FIG. 1 is a diagram showing an example of the configuration of the robot system 1 according to this embodiment. The robot system 1 includes a robot 20, a robot control device 30, an image processing device PU, a camera CR, a display device DP, a PC for development 601, an operation key 602, and a display device 621.

In the example shown in FIG. 1, among components other than a table TB, all of the components other than the operation key 602 are placed and disposed on the table TB.

Concerning the components other than the operation key 602, a part of the components such as the robot 20 may be disposed on the outer side of the table TB (e.g., a floor).

Note that the table TB does not always have to be used. All of the components may be disposed on the floor or the like.

A belt conveyor BC includes a driving section and a belt. The driving section drives the belt to move. Consequently, the belt conveyor BC moves a target object P placed on the belt. In the example shown in FIG. 1, seven target objects P, that is, target objects P1 to P7 are placed on the belt conveyor BC and moved. Note that the number of the target objects P moved by the belt conveyor BC may be less than seven or may be seven or more.

In the example shown in FIG. 1, the belt conveyor BC moves an object placed on the belt conveyor BC in a decided moving direction. In this embodiment, the moving direction is a direction from a position where an image of the object is picked up by the camera CR to a position where work of the object is performed by the robot 20.

In the example shown in FIG. 1, a part of the belt conveyor BC is shown. As an example, the belt conveyor BC extends from a predetermined start point (not shown in the figure) to a predetermined endpoint (not shown in the figure). The predetermined start point is, for example, a position where a device that places the target object P on the belt conveyor BC is disposed. The predetermined end point is, for example, a position several meters ahead of a work region, where the robot 20 performs predetermined work, in a moving direction. As another example, the belt included in the belt conveyor BC may be an annular belt that does not have a start point and an end point.

Any work may be performed on the target objects P1 to P7, which are placed on the belt conveyor BC and moved, in a place (not shown in the figure) other than a place of work by the robot 20 according to this embodiment.

Note that, in this embodiment, the target objects P1 to P7 are placed on the belt conveyor BC and moved. However, as another configuration example, the target objects P1 to P7 may be disposed in a state in which the target objects P1 to P7 are placed on a stage and stand still. The stage may be the table TB or may be another thing.

The target objects P1 to P7 are an example of work used in work performed by the robot 20. The target objects P1 to P7 are industrial components or members such as plates, screws, and bolts assembled to a product. In FIG. 1, the target objects P1 to P7 are shown as objects having a shape obtained by combining a rectangular parallelepiped and a semi-cylindrical shape. Note that the target objects P1 to P7 may be other objects such as daily necessities or living organisms instead of the industrial components or members. The shape of the target objects P1 to P7 may be another shape instead of the shape obtained by combining the rectangular parallelepiped and the semi-cylindrical shape.

In the example shown in FIG. 1, among the target objects P1 to P7, the target object P4 and the target object P5 and the target object P6 and the target object P7 are respectively disposed in an overlapping state. However, the target objects P1 to P7 may be disposed not to overlap one another or all of the target objects P1 to P7 may be disposed in an overlapping state.

The camera CR is an image pickup device that picks up an image G of a predetermined range. In the example shown in FIG. 1, the predetermined range is a range further on a near side than a range in which the robot 20 can perform work on the belt of the belt conveyor BC and is a range in which the camera CR can pick up an image of an entire range including respective contours of at least one or more target objects P among the target objects P moved by the belt conveyor BC. Note that the predetermined range in which the camera CR performs image pickup may be a range including an entire range in which the belt of the belt conveyor BC is set. In this example, the camera CR is supported by a supporting section SP in a position where the camera CR is capable of picking up an image of the target objects P1 to P7 placed on the belt conveyor BC and moved. In the example shown in FIG. 1, the camera CR is disposed in a position where an optical axis of image pickup of the camera CR is orthogonal to the upper surface of the belt of the belt conveyor BC (i.e., a position where the upper surface of the belt of the belt conveyor BC and the surface of a picked-up image are parallel).

The camera CR is communicatively connected to the image processing device PU by a cable. Consequently, the camera CR transmits information (image data) concerning the picked-up image G to the image processing device PU via the cable. The image processing device PU receives, via the cable, the image data indicating the image G transmitted from the camera CR. Note that wired communication via the cable between the camera CR and the image processing device PU is performed according to a standard such as Ethernet (registered trademark) or USB (Universal Serial Bus). The camera CR may be connected to the image processing device PU by wireless communication performed according to a communication standard such as Wi-Fi (registered trademark).

In this embodiment, the camera CR is fixed to the supporting section SP. However, as another configuration example, a configuration capable of changing a range of image pickup by the camera CR may be used.

As another configuration example, another device may be used instead of the camera CR as a device that measures information such as the shape of the target objects P1 to P7. For example, a measuring device including a laser may be used.

Image Processing Device

The image processing device PU receives, via the cable, information concerning an image transmitted from the camera CR. The image processing device PU transmits the received information concerning the image to the robot control device 30 via a cable. The image processing device PU is communicatively connected to the robot control device 30 by the cable. Consequently, the image processing device PU transmits the information (image data) concerning the image G to the robot control device 30 via the cable.

The robot control device 30 receives, via the cable, the image data indicating the image G transmitted from the image processing device PU. Note that wired communication via the cable between the image processing device PU and the robot control device 30 is performed according to a standard such as Ethernet (registered trademark) or USB (Universal Serial Bus). The camera CR may be connected to the image processing device PU by wireless communication performed according to a communication standard such as Wi-Fi (registered trademark). Note that the image processing device PU may perform predetermined image processing on the information concerning the image received from the camera CR and transmit information concerning a result of the image processing to the robot control device 30 via the cable.

The image processing device PU outputs (transmits) display target information to the display device DP. As the display target information, for example, the information concerning the image G picked up by the camera CR may be used, the information concerning the result of the image processing performed by the image processing device PU may be used, or the information concerning the result of the processing performed by the robot control device 30 may be used.

Note that, during development, apart or all of image processing, display control, and the like performed by the image processing device PU may be performed on the basis of control from the PC for development 601.

In the example shown in FIG. 1, it can be grasped that, in the robot system 1, an image processing system including the image processing device PU is provided. The image processing system may include, for example, the camera CR. The image processing system may include, for example, the display device DP.

Note that the image processing system may be, for example, an image measuring system that measures an image.

Display Device

The display device DP is communicatively connected to the image processing device PU by a cable. Consequently, the image processing device PU transmits image data received from the robot control device 30 to the display device DP via the cable. Note that wired communication via the cable between the display device DP and the image processing device PU is performed according to a standard such as Ethernet (registered trademark) or USB (Universal Serial bus). The display device DP may be connected to the image processing device PU by wireless communication performed according to a communication standard such as Wi-Fi (registered trademark).

The display device DP is, for example, a display device including a liquid crystal display panel or an organic EL (ElectroLuminescence) display panel. The display device DP receives, via the cable, image data indicating the image G transmitted from the image processing device PU and displays the image G indicated by the received image data.

PC for Development

The PC for development 601 is used when a computer program used in the robot control device 30 is developed. The computer program is, for example, a computer program for controlling the operation of the robot 20.

The PC for development 601 communicates with the robot control device 30 via a cable.

Note that the PC for development 601 does not have to be connected to the robot control device 30, for example, after the development is completed.

The PC for development 601 has, for example, a function of setting conditions of predetermined processing performed by the robot 20. As the conditions of the processing, any conditions may be used. For example, values or ranges of parameters (which may also be referred to as "properties" or the like) used in the processing.

In this embodiment, during the development, the PC for development 601 gives commands (instructions) to the image processing device PU via the robot control device 30, whereby various kinds of processing are performed. During the development, for example, an operation section included in the PC for development 601 is operated by a user.

The display device 621 is, for example, a display device that displays information on a screen. The display device 621 receives image data from the PC for development 601 via a cable and displays received information on the screen.

The PC for development 601 outputs (transmits) display target information to the display device 621. As the display target information, for example, the information concerning the image G picked up by the camera CR may be used, the information concerning the result of the image processing performed by the image processing device PU may be used, or the information concerning the result of the processing performed by the robot control device 30 may be used.

In this embodiment, the PC for development 601 instructs the image processing device PU to execute image processing. The image processing device PU transmits an image and an image processing result to the PC for development 601. The PC for development 601 causes the display device 621 to display the received image and the received image processing result.

In this embodiment, during the development, various kinds of information are displayed on the display device 621 of the PC for development 601 functioning as a main display device.

Note that information same as the information displayed on the display device 621 of the PC for development 601 may be displayed on the display device DP of the image processing device PU or other information may be displayed. In this embodiment, the display device DP of the image processing device PU is used as an auxiliary (sub) display device. For example, the display device DP of the image processing device PU may perform display of an automatically operating target object or result display.

SCARA Robot

In this example, the robot 20 is a SCARA robot. Note that the robot 20 may be another robot such as a Cartesian coordinate robot, a single-arm robot, or a dual-arm robot instead of the SCARA robot. The Cartesian coordinate robot is, for example, a gantry robot.

In the example shown in FIG. 1, the robot 20 is set on the table TB. Note that the robot 20 may be set on a wall surface, a ceiling surface, a jig, the upper surface of a stand, or the like instead of the table TB. In the following explanation, for convenience of explanation, a direction orthogonal to a surface on which the robot 20 is set, that is, a direction from the robot 20 to the surface is referred to as lower and a direction opposite to the direction is referred to as upper. The direction orthogonal to the surface on which the robot 20 is set, that is, the direction from the center of gravity of the robot 20 to the surface is, for example, a negative direction of a Z axis in a world coordinate system or a negative direction of a Z axis in a robot coordinate system RC.

The robot 20 includes a supporting stand B set on the table TB and a movable section AM. The movable section AM includes a first arm AM1 supported to be capable of turning around a not-shown first axis AX1 by the supporting stand B, a second arm AM2 supported to be capable of turning around a not-shown second axis AX2 by the first arm AM1, and a shaft (an actuating shaft) S supported to be capable of turning around a not-shown third axis AX3 and capable of translating in the axial direction of the third axis AX3 by the second arm AM2. The movable section AM is an example of an arm.

The shaft S is a shaft body having a columnar shape. A not-shown ball screw groove and a not-shown spline groove are formed on the circumferential surface of the shaft S. The shaft S is provided to vertically pierce through an end portion on the opposite side of the first arm AM1 of end portions of the second arm AM2. In the shaft S, in this example, a disk-shaped flange having a radius larger than the radius of the cylinder is provided at an end portion on the upper side of end portions of the shaft S. The center axis of the column coincides with the center axis of the flange.

An end effector E is provided at the end portion of the shaft S where the flange is not provided. In this example, the end effector E is an end effector including a finger section capable of gripping an object. Note that the end effector E may be an end effector capable of lifting an object with suction of the air, a magnetic force, a jig, or the like or another end effector instead of the end effector including the finger section.

The end effector E is communicatively connected to the robot control device 30 by a cable. Consequently, the end effector E performs operation based on a control signal acquired from the robot control device 30.

The supporting stand B is fixed to the table TB. The supporting stand B includes a not-shown first joint. The first axis AX1 refers to a turning axis of the first joint. The first joint includes a not-shown actuator and turns the first arm AM1 around the first axis AX1 on the basis of a control signal acquired from the robot control device 30.

Since the first arm AM1 turns around the first axis AX1, the first arm AM1 moves in the horizontal direction. In this example, the horizontal direction is a direction orthogonal to the vertical direction. The horizontal direction is, for example, a direction along an XY plane in the world coordinate system or a direction along an XY plane in the robot coordinate system RC.

The second arm AM2 includes a not-shown second joint. The second axis AX2 refers to a turning axis of the second joint. The second joint includes a not-shown actuator and turns the second arm AM2 around the second axis AX2 on the basis of a control signal acquired from the robot control device 30. Since the second arm AM2 turns around the second axis AX2, the second arm AM2 moves in the horizontal direction.

The second arm AM2 includes a not-shown up-down moving actuator and a not-shown turning actuator and supports the shaft S. The up-down moving actuator turns, with a timing belt or the like, a ball screw nut provided in the outer circumferential section of a ball screw groove of the shaft S to thereby move (raise and lower) the shaft S in the vertical direction (i.e., the axial direction of the third axis AX3). The turning actuator turns, with a timing belt, a ball spline nut provided in the outer circumferential section of a spline groove of the shaft S to thereby turn the shaft S around the center axis of the shaft S (i.e., the third axis AX3).

Each of the actuators included in the robot 20 is communicatively connected to the robot control device 30 by a cable. Consequently, each of the actuators performs operation based on a control signal acquired from the robot control device 30.

Robot Control Device

The robot control device 30 acquires image data indicating the image G from the image processing device PU via the cable. Note that, in a configuration in which the disposition of the camera CR can be changed, the robot control device 30 may be capable of controlling and changing the disposition of the camera CR. In this case, the robot control device 30 may control, for example, the camera CR. A configuration may be adopted in which the image processing device PU controls the camera CR instead of the configuration in which the robot control device 30 controls the camera CR.

The robot control device 30 and the PC for development 601 are communicatively connected via the cable. Note that wired communication via the cable between the robot control device 30 and the PC for development 601 is performed according to a standard such as Ethernet (registered trademark) or USB (Universal Serial Bus). The PC for development 601 may be connected to the robot control device 30 by wireless communication performed according to a communication standard such as Wi-Fi (registered trademark).

The robot control device 30 and the operation key 602 are communicatively connected via a cable. Note that wired communication via the cable between the robot control device 30 and the operation key 602 is performed according to a standard such as Ethernet (registered trademark) or USB (Universal Serial Bus). The operation key 602 may be connected to the robot control device 30 by wireless communication performed according to a communication standard such as Wi-Fi (registered trademark).

Operation Key

The operation key 602 is an example of an operation device provided on the outside of the robot control device 30. The operation key 602 includes an operation section (e.g., one or more keys) operated by the user. The operation key 602 receives content of operation performed on the operation section by the user and transmits the content of the operation to the robot control device 30.

The operation key 602 is a teaching pendant including a keyboard, a mouse, or a touch pad or another input device. The operation key 602 acquires operation performed by an operator of the PC for development 601, the robot control device 30, or the image processing device PU on the basis of the image G displayed by the display device 621 or the display device DP and transmits operation information indicating the acquired operation to the robot control device 30 via the cable. The robot control device 30 transmits the received operation to the PC for development 601.

The robot control device 30 transmits information for display to the display device 621 via a cable. The robot control device 30 acquires information indicating operation input to the operation key 602 by the operator of the robot control device 30 according to display of the information for display on the display device 621.

The robot control device 30 controls the robot 20. For example, the robot control device 30 controls respective actuators and respective end effectors E included in the robot 20.

Overview of Predetermined Work Performed by the Robot

In the example shown in FIG. 1, the robot 20 performs, as predetermined work, work for gripping, one by one, the target objects P1 to P7 placed on the belt conveyor BC and moved and placing the gripped target object P in a not-shown material supply region.

Overview of Processing in which the PC for Development and the Robot Control Device Cause the Robot to Perform the Predetermined Work An overview of processing in which the PC for development 601 and the robot control device 30 cause the robot 20 to perform the predetermined work is explained below.

The display device 621 receives image data indicating the image G from the robot control device 30 and displays the image G indicated by the image data. The operator of the PC for development 601 designates a first target object, which is the target object P desired by the operator, among a plurality of target objects P included in the image G displayed on the display device 621. Specifically, the operator of the PC for development 601 performs operation for inputting first region information indicating a first region, which is a region of the first target object, to an input section IP (not shown in the figure) included in the PC for development 601. The input section IP is a keyboard, a mouse, or the like. The operator of the PC for development 601 performs operation for inputting second region information indicating a second region, which is a region for designating the first target object and different from the first region, to the input section IP. The PC for development 601 acquires the first region information indicating the first region and the second region information indicating the second region from the input section IP. The PC for development 601 associates, on the basis of the acquired first region information and the acquired second region information, a first region corresponding to the first region designated for the first target object and a second region corresponding to the second region designated for the first target object with at least a part of the plurality of target objects P included in the image G. The robot control device 30 causes the robot 20 to grip, on the basis of the first region and the second region, the target object P associated with the first region and the second region by the PC for development 601. The robot control device 30 operates the robot 20 and places the target object P in a not-shown supply region.

The PC for development 601 sets, on the basis of the acquired first region information and the acquired second region information, a third region corresponding to the first region and a fourth region corresponding to the second region in the image G of at least a part of the plurality of target objects P and causes the display device 621 to display the third region and the fourth region and at least the part of the target objects P for which the third region and the fourth region are set.

Hardware Configuration of the Robot Control Device

Figure 2:
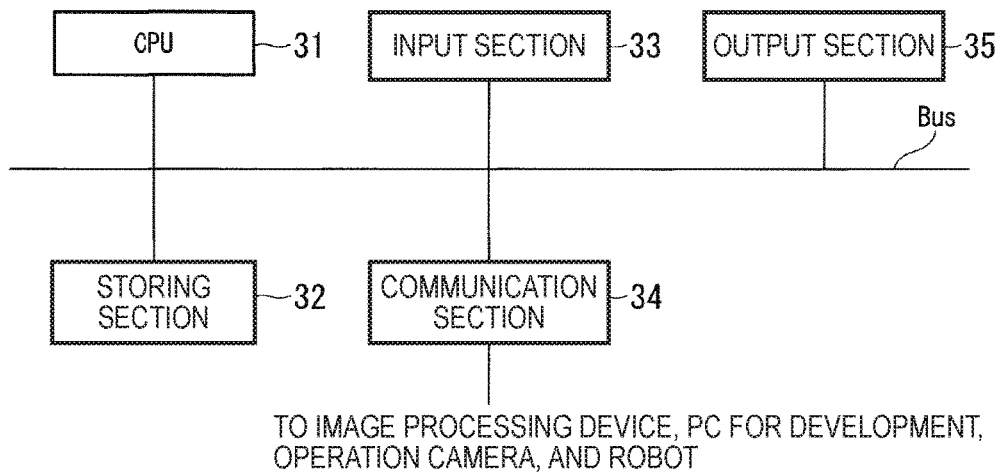
FIG. 2 is a diagram showing an example of a hardware configuration of a robot control device.

A hardware configuration of the robot control device 30 is explained below with reference to FIG. 2. FIG. 2 is a diagram showing an example of the hardware configuration of the robot control device 30. The robot control device 30 includes, for example, a CPU (Central Processing Unit, at least one processor) 31, a storing section 32, an input section 33, a communication section 34, and an output section 35. These components are communicatively connected to one another via a bus Bus. The robot control device 30 performs communication with the robot 20, the PC for development 601, the operation key 602, and the image processing device PU via the communication section 34. The communication section 34 includes, for example, a digital input/output port such as a USB or an Ethernet (registered trademark) port.

The input section 33 receives an input of information output from an external device. In the example shown in FIG. 1, the input section 33 receives an input of, for example, information output (transmitted) from the image processing device PU, the PC for development 601, or the operation key 602.

The output section 35 outputs the information to the outside. As an example, the output section 35 outputs (transmits) information to a display screen. As another example, the output section 35 may output (transmit) information concerning sound to a speaker that emits sound (including voice). The output section 35 outputs information to, for example, the robot 20 (e.g., a manipulator M1 and an end effector E1), the PC for development 601, the image processing device PU, or the operation key 602.

Note that, in this embodiment, the robot control device 30 and the display device 621 are not connected. However, as another configuration example, the display device 621 may be connected to the output section 35 of the robot control device 30 as an integral body or a separate body.

The operation section included in the input section 33 may be, for example, a touch panel including a display screen (or another screen).

The CPU 31 executes various computer programs stored in the storing section 32.

The storing section 32 includes, for example, a HDD (Hard Disk Drive) or an SSD (Solid State Drive), an EEPROM (Electrically Erasable Programmable Read-Only Memory), a ROM (Read-Only Memory), or a RAM (Random Access Memory). Note that the storing section 32 may be, instead of a storing section incorporated in the robot control device 30, an external storage device connected by, for example, a digital input/output port such as the USB. The storing section 32 stores various kinds of information and images to be processed by the robot control device 30, computer programs, and the like.

Functional Configuration of the Robot Control Device

Figure 3:
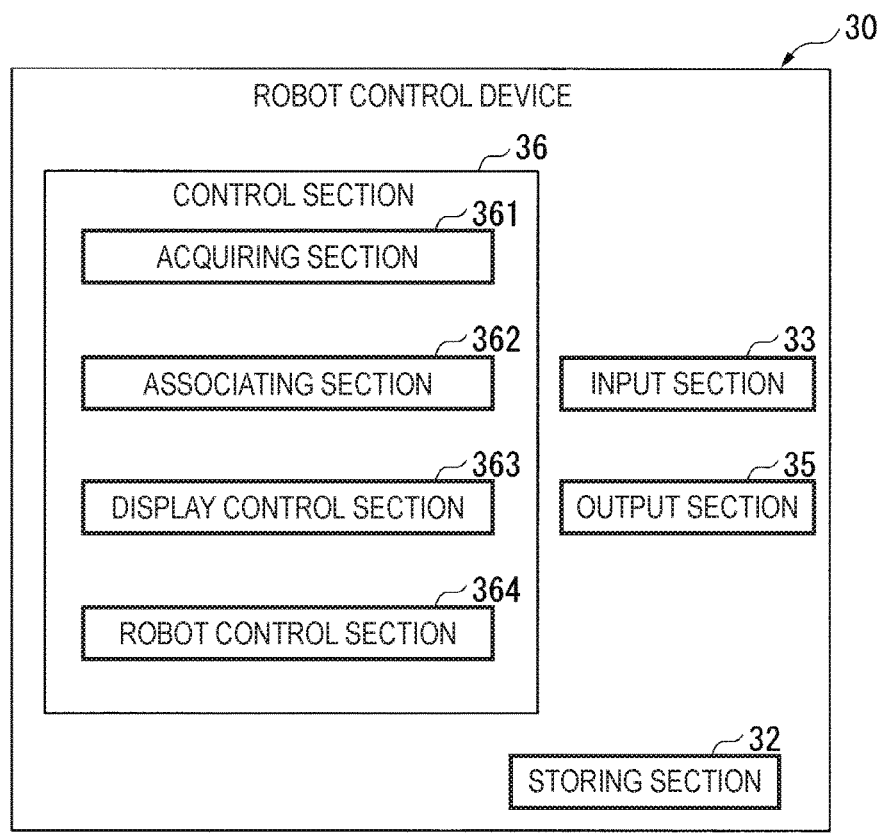
FIG. 3 is a diagram showing an example of a functional configuration of the robot control device.

A functional configuration of the robot control device 30 is explained with reference to FIG. 3. FIG. 3 is a diagram showing an example of a functional configuration of the robot control device 30. The robot control device 30 includes the storing section 32 and a control section 36.

The control section 36 controls the entire robot control device 30. The control section 36 includes an acquiring section 361, an associating section 362, a display control section 363, and a robot control section 364. These functional sections included in the control section 36 are realized by, for example, the CPU 31 executing various computer programs stored in the storing section 32. A part or all of the functional sections may be hardware functional sections such as an LSI (Large Scale Integration) and an ASIC (Application Specific Integrated Circuit).

The acquiring section 361 acquires, from the PC for development 601, information indicating operation received by the input section IP. The operation received by the input section IP includes operation by the operator for designating the first region for the first target object, which is the target object P desired by the operator, among the target objects P included in the image G displayed by the display device 621 and operation by the operator for designating the second region different from the first region for the first target object. The target objects P included in the image G are the target objects P subjected to image pickup by the camera CR and shown in the image G. The acquiring section 361 acquires first region information indicating the first region and second region information indicating the second region received by the input section IP. Note that the operation received by the input section IP may be at least one of the operation by the operator for designating the first region with respect the first target object, which is the target object P desired by the operator, and the operation by the operator for designating the second region different from the first region for the first target object. In this case, the first region or the second region on which the designating operation by the operator is not performed is associated with the first target object in advance.

The associating section 362 associates, on the basis of the first region information and the second region information acquired by the acquiring section 361, a first region corresponding to the first region associated with the first target object and a second region corresponding to the second region associated with the first target region with each of at least a part of the plurality of target objects P included in the image G. In this embodiment, the associating section 362 associates a first region corresponding to the first region associated with the first target object and a second region corresponding to the second region associated with the first target object with each of all of the target objects P included in the image G.

Note that, when only operation by the operator for designating the first region for the first target object, which is the target object P desired by the operator, is performed, the second region on which the designating operation by the operator is not performed may be associated with a position corresponding to the position of the first region associated with the first target object.

The display control section 363 generates a display image DG, which is an image indicating a third region and a fourth region respectively corresponding to the first region and the second region associated with the target object P by the associating section 362 and the target object P. The display control section 363 causes the display device 621 to display the generated display image DG.

The robot control section 364 causes the robot 20 to grip the target object P on the basis of the first region and the second region associated with each of the target objects P by the associating section 362.

Association Processing by the Robot Control Device

Figure 4:
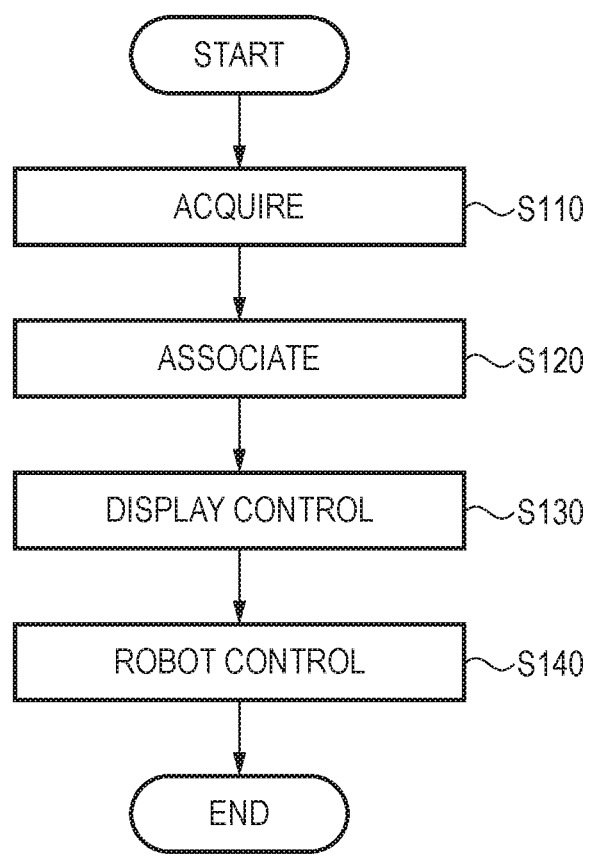
FIG. 4 is a flowchart for explaining an example of a flow of processing performed by the robot control device.

Association processing by the robot control device 30 is explained below with reference to FIG. 4. FIG. 4 is a flowchart for explaining an example of a flow of processing performed by the robot control device 30.

The acquiring section 361 acquires, from the PC for development 601, the first region information and the second region information received by the input section IP from the operator (step S110). The first region and the second region designated for the first target object are explained below with reference to FIGS. 5 to 7.

Figure 5:
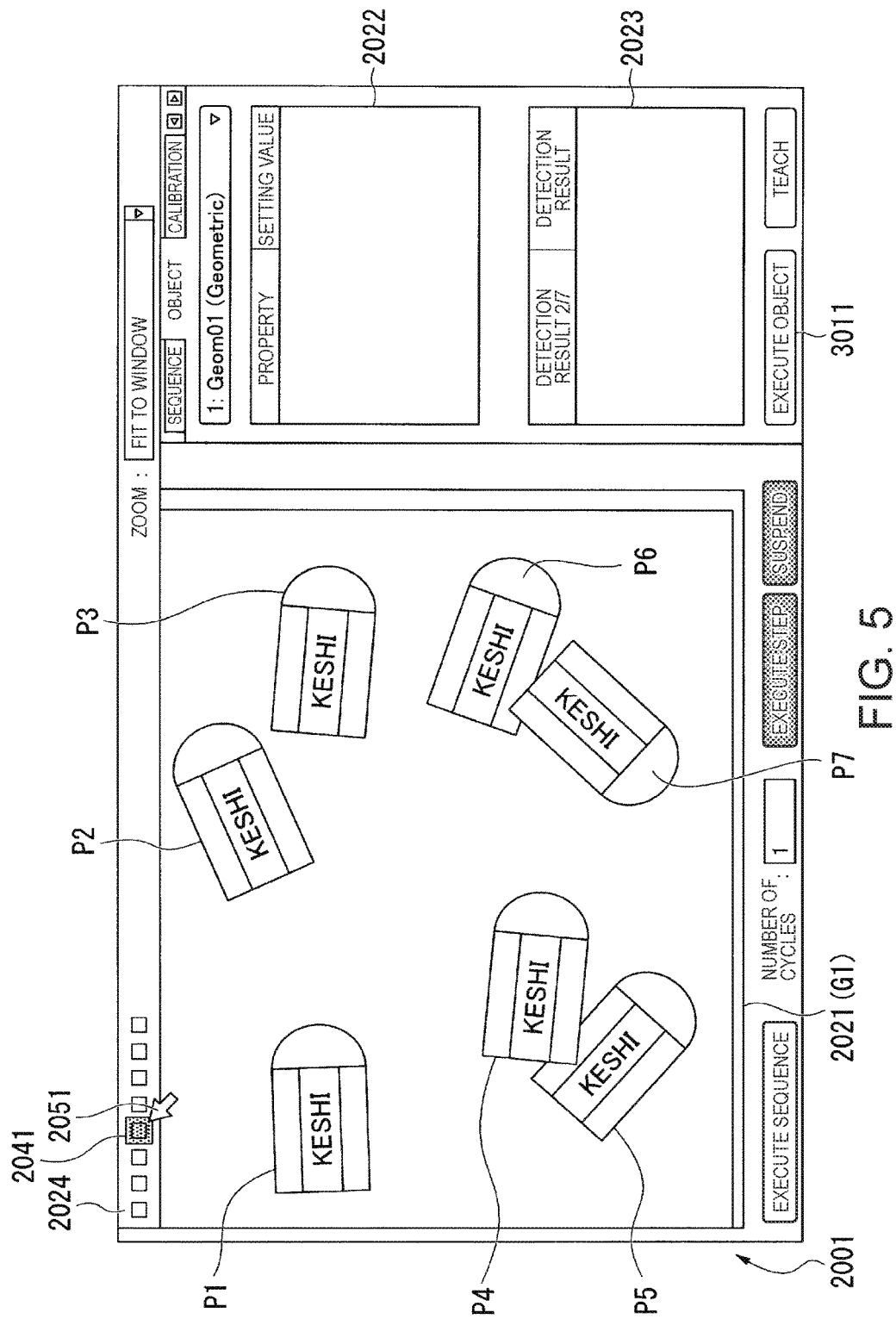
FIG. 5 is a first diagram of a specific example 1 of a first region designated for a first target object.
Figure 6:
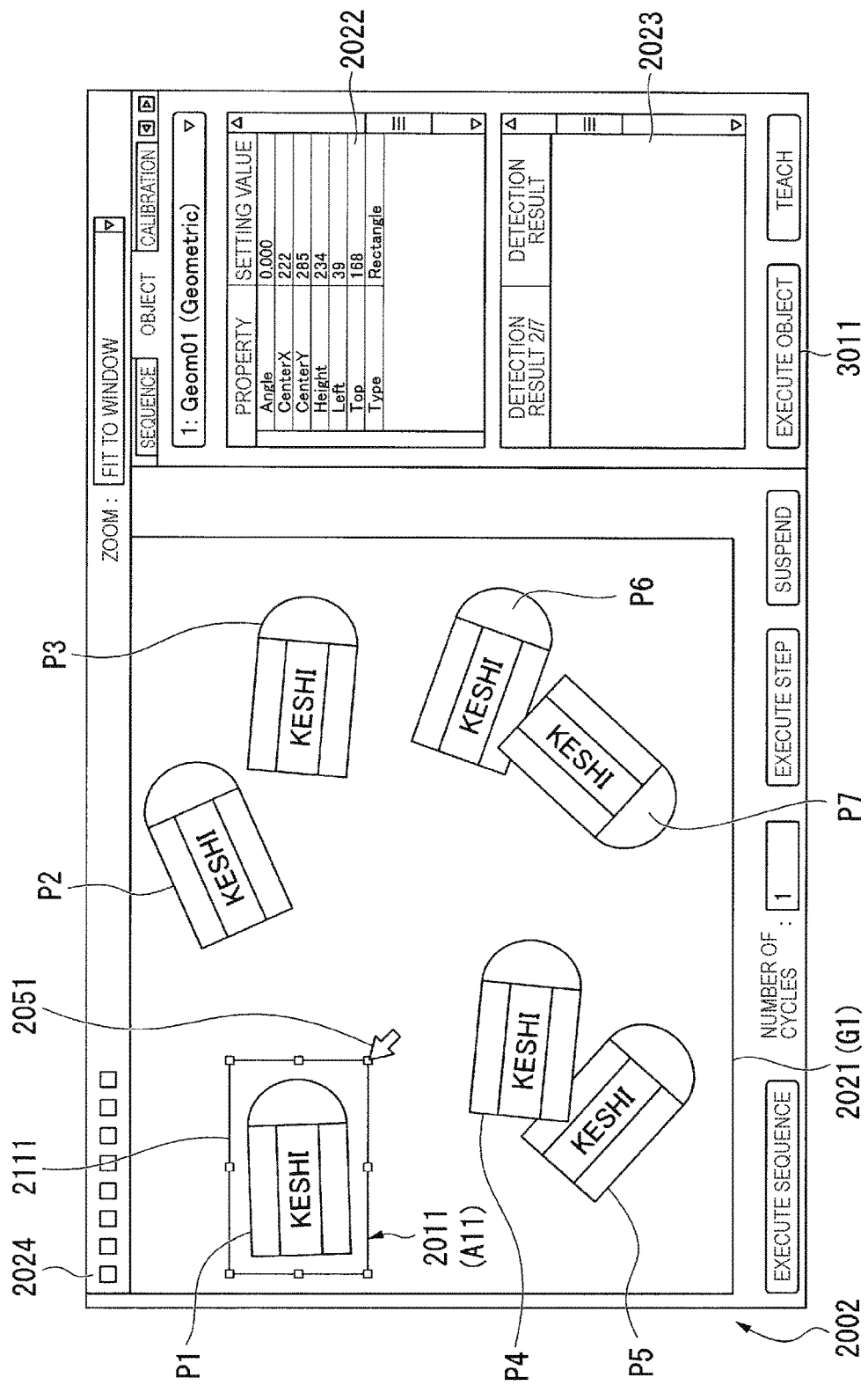
FIG. 6 is a second diagram of the specific example 1 of the first region designated for the first target object.
Figure 7:
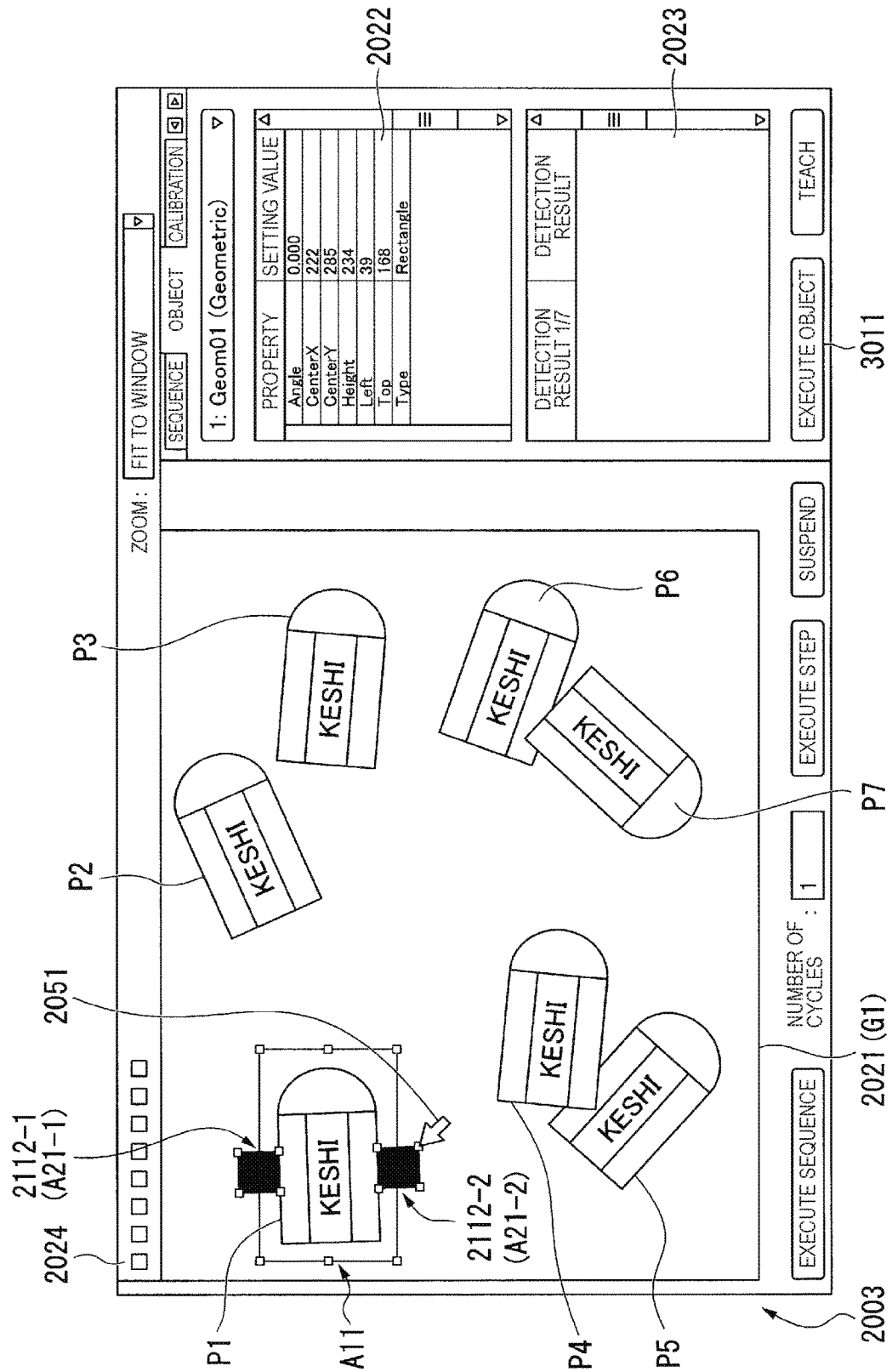
FIG. 7 is a diagram showing an example of a second region designated for the first target object.

FIG. 5 is a first diagram of a specific example 1 of the first region designated for the first target object. FIG. 6 is a second diagram of the specific example 1 of the first region designated for the first target object. FIG. 7 is a diagram showing an example of a second region designated for the first target object.

Specifically, FIG. 5 is a diagram showing an example of a screen 2001 displayed in the association processing. FIG. 6 is a diagram showing an example of a screen 2002 displayed in the association processing. FIG. 7 is a diagram showing an example of a screen 2003 displayed in the association processing.

Schematic configurations of the screens 2001 to 2003 are the same. The screens 2001 to 2003 include an image display section 2021, a property-setting display section 2022, a detection-result display section 2023, an icon display section 2024, and an object execution button 3011. Information displayed on the inside of each of the image display section 2021, the property-setting display section 2022, and the detection-result display section 2023 can change according to, for example, a state of processing.

The image display section 2021 is a portion for displaying an image. The property-setting display section 2022 is a portion for displaying a field for setting properties. The detection-result display section 2023 is a portion for displaying a detection result. The icon display section 2024 is a portion for displaying a plurality of icons. The object execution button 3011 is a button for executing processing.

In this example, image processing and display processing by the image processing device PU are performed according to control by the PC for development 601.

First, as shown in FIG. 5, the screen 2001 is displayed on the display device 621. In the example shown in FIG. 5, an input image G1 is displayed in the image display section 2021.

When the position of a cursor 2051 is set to the position of a predetermined icon 2041 and designated (e.g., clicked) according to operation performed by the operator, processing associated with the icon 2041 is performed.

The predetermined icon 2041 is associated with processing for designating the first region designated for the first target object.

The image G1 includes the target objects P1 to P7 in a state of images picked up by the camera CR. The target objects P1 to P7 have the same shape. The robot control device 30 receives image data of the image G1 from the image processing device PU and transmits the image data to the PC for development 601. The display device 621 receives the image data of the image G1 from the PC for development 601 and displays the image G1. The operator of the PC for development 601 designates, on the basis of the image G1 displayed on the display device 621, the first region in the first target object, which is the target object P desired by the operator, among the target objects P included in the image G1. Specifically, the operator designates, with the input section IP, a position and a size of a region A11 serving as the first region designated for the first target object.

The screen 2002 shown in FIG. 6 is displayed.

In the example shown in FIG. 6, when the screen 2002 (e.g., a region of the image display section 2021) is designated (e.g., clicked) by the cursor 2051 according to operation performed by the operator, a window 2111 is displayed in the image display section 2021.

The window 2111 is a frame representing a region (the region A11) for designating the first region designated for the first target object in an image displayed in the image display section 2021. The window 2111 may be, for example, a frame having a color different from a color around the frame or may be a red frame or the like.

Values of properties (e.g., values of a size and a shape) of the window 2111 are set to default values in an initial period. The default values are values decided in advance and can be changed according to operation performed by the operator.

In the example shown in FIG. 6, the values of the properties of the window 2111 are displayed in the property-setting display section 2022. The values of the properties can be changed according to operation performed by the operator.

In the example shown in FIG. 6, as the values (setting values) of the properties of the window 2111, there are an angle (Angle), an X coordinate value (Center X) of a center-of-gravity position (or a center-of-figure position), a Y coordinate value (Center Y) of the center-of-gravity position (or the center-of-figure position), length in a height direction (Height), a position on the left side (Left), a position on the upper side in the height direction (Top), and a type of a shape (Type).

A region of the image display section 2021 is represented by a plane of an XY orthogonal coordinate system. An X coordinate corresponds to the lateral direction. A Y coordinate corresponds to the height direction (the longitudinal direction).

In the example shown in FIG. 6, a rectangle (Rectangle) is used as the type of the shape (Type). However, another shape may be used. For example, a shape such as a circle or an ellipse may be used.

In the example shown in FIG. 6, as the region A11, which is the first region, the window 2111 is set in which the X coordinate value (Center X) of the center-of-gravity position (or the center-of-figure position) is 222, the Y coordinate value (Center Y) of the center-of-gravity position (or the center-of-figure position) is 285, the length in the height direction (Height) is 234, the position on the left side (Left)

is 39, the position on the upper side in the height direction (Top) is 168, and the type of the shape (Type) is a rectangle (Rectangle).

As shown in FIG. 6, in this example, the first target object is the target object P1. As shown in FIG. 6, in this embodiment, the first region having a rectangular shape is associated with the first target object. In this example, the first region is designated by the configuration explained above in a position where the center of the first region and the center of gravity of the first target object coincide with each other. The first region designated for the first target object is a region including the entire contour of the target object P1, which is the first target object, and is a region based on the shape of the first target object. Note that operation for the designation performed by the operator may be performed using, for example, an operation section included in the PC for development 601. As another configuration example, the operation may be performed using another operation section (e.g., an operation section included in the image processing device PU, the robot control device 30, or the operation key 602).

Subsequently, the screen 2003 shown in FIG. 7 is displayed.

In the example shown in FIG. 7, when the screen 2003 (e.g., a region of the image display section 2012) is designated (e.g., clicked) by the cursor 2051 according to operation performed by the operator, windows 2112 (in this example, windows 2112-1 and 2112-2) are displayed in the image display section 2021.

The windows 2112 (the windows 2112-1 and 2112-2) are frames representing regions (regions A21-1 and A21-2) designating the second region designated for the first target object in the image displayed in the image display section 2021. The windows 2112 may be frames having a color different from a color around the windows 2112 and may be red frames or the like.

Values of properties (e.g., values of a size and a shape) of the windows 2112 are set to default values in an initial period. The default values are values decided in advance and can be changed according to operation performed by the operator.

In the example shown in FIG. 7, the values of the properties of the windows 2112 are displayed in the property-setting display section 2022. The values of the properties can be changed according to operation performed by the operator.

In the example shown in FIG. 7, as the values (setting values) of the properties of the windows 2112, there are an angle (Angle), an X coordinate value (Center X) of a center-of-gravity position (or a center-of-figure position), a Y coordinate value (Center Y) of the center-of-gravity position (or the center-of-figure position), length in a height direction (Height), a position on the left side (Left), a position on the upper side in the height direction (Top), and a type of a shape (Type).

A region of the image display section 2021 is represented by a plane of an XY orthogonal coordinate system. An X coordinate corresponds to the lateral direction. A Y coordinate corresponds to the height direction (the longitudinal direction).

In the example shown in FIG. 7, a rectangle (Rectangle) is used as the type of the shape (Type). However, another shape may be used. For example, a shape such as a circle or an ellipse may be used.

The operator of the PC for development 601 designates, on the basis of the image G1 displayed on the display device 621, the second region, which is a region different from the first region, for the first target object associated with the first region. Specifically, the operator designates, with the input section IP, positions and sizes of the region A21-1 and the region A21-2 serving as the second region of the first target object according to the configuration explained above. The second region designated for the first target object is a region concerning gripping of the target object P by the robot 20. The region concerning the gripping of the target object P is, for example, a region based on the shape of the end effector E included in the robot 20. The position of the second region is a position based on the position of the end effector E at the time when the end effector E grips the target object P.

After the processing in step S110 is performed, the associating section 362 associates, on the basis of the first region information and the second region information acquired by the acquiring section 361, a first region corresponding to the first region associated with the first target object and a second region corresponding to the second region associated with the first target object with each of the target objects P included in the image G (step S120). The first region and the second region associated with each of the target objects P included in the image G are explained below with reference to FIG. 9.

Figure 8:
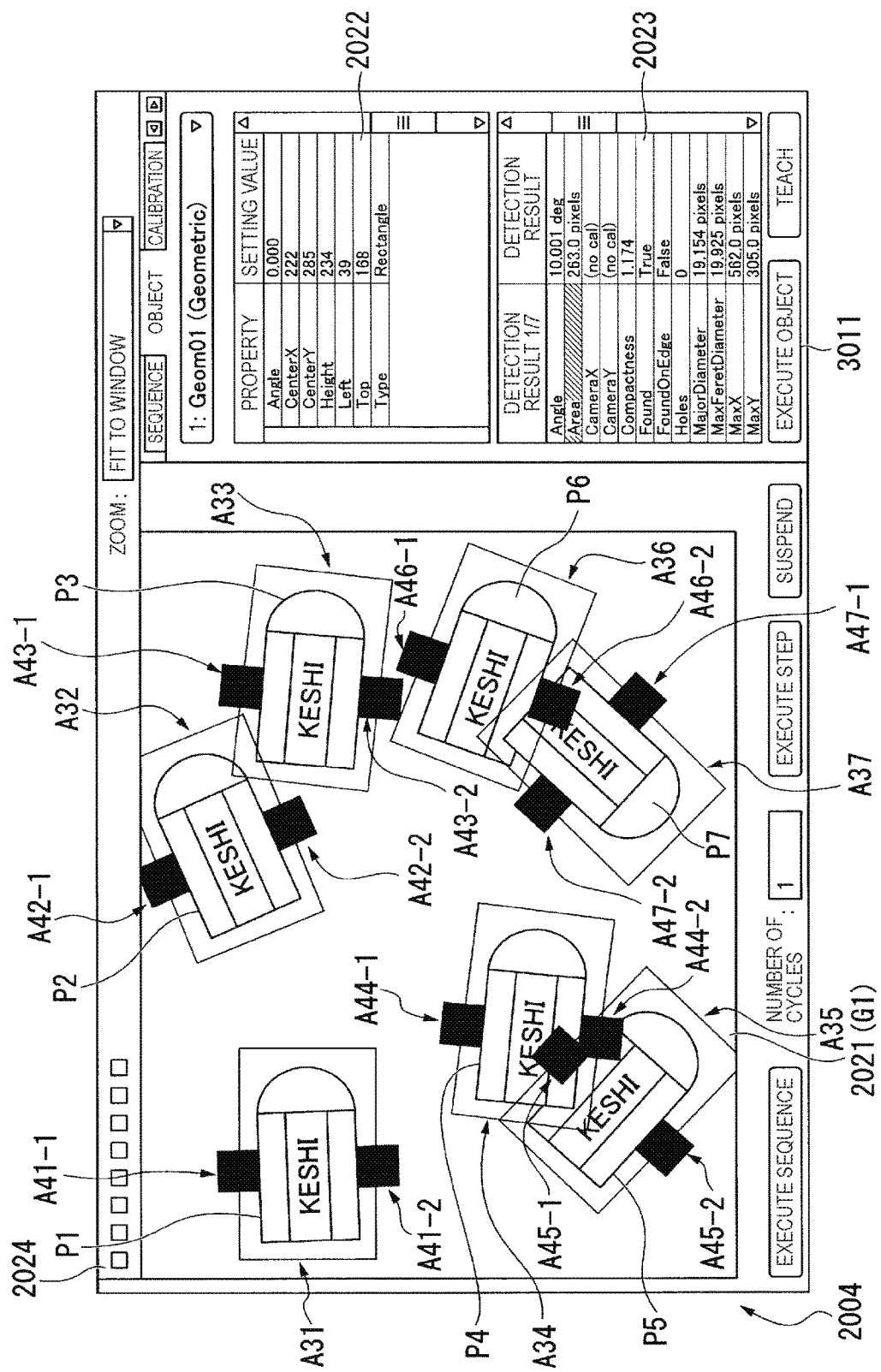
FIG. 8 is a diagram showing an example of the first region and the second region associated with each of target objects included in an image.

FIG. 8 is a diagram showing an example of the first region and the second region associated with each of the target objects P included in the image G.

The associating section 362 associates, on the basis of the first region indicated by the first region information acquired from the acquiring section 361, the first region corresponding to the first region associated with the first target object with the target objects P (in this example, the target objects P1 to P7) included in the image G1. Specifically, the associating section 362 detects an edge of the first target object included in the first region in the image G1 according to known image recognition. The associating section 362 detects the target objects having contours and sizes same as the contour and the size of the target objects P (in this example, the target objects P1 to P7) in the image G1. Note that a method in which the associating section 362 detects the edge of the first target object included in the first region may be a method by the known image recognition or may be a method to be developed in future. The associating section 362 associates, with the target objects P having contours and sizes same as the contour and the size of the first target object in the image G1, the first region having a contour and a size same as the contour and the size of the first region associated with the first target object in a position relatively the same as the position of the first region for the first target object. As shown in FIG. 8, in this example, as the first region, regions A31 to A37 are associated with the target objects P1 to P7 included in the image G1. The regions A31 to A37 are regions including the entire contour of the first target object and regions based on the shape of the first target object. As explained above, in this example, the target objects P1 to P7 included in the image G1 have the same shape. Therefore, the regions A31 to A37 are regions including the entire contours of the target objects P1 to P7 and are regions based on the shape of the target objects P1 to P7. Note that the associating section 362 may give numbers to the target objects P in order from the target object P having a highest degree of similarity (similarity degree) to the first target object among the target objects P included in the image G. In this case, the display device 621 may display the numbers according to a known method.

The associating section 362 associates, on the basis of the second region indicated by the second region information acquired from the acquiring section 361, a second region corresponding to the second region associated with the first target object with the target objects P (in this example, the target objects P1 to P7) included in the image G1. Specifically, the associating section 362 associates the second region corresponding to the second region with the target objects P included in the image G1 according to a method same as the method of associating the first region corresponding to the first region with the target objects P included in the image G1 on the basis of the first region information. As shown in FIG. 8, in this example, regions A41 to A47 are associated with, as the second region, the target objects P1 to P7 included in the image G1. Specifically, regions A41-1 and A41-2 are associated with the target object P1, regions A42-1 and A42-2 are associated with the target object P2, regions A43-1 and A43-2 are associated with the target object P3, regions A44-1 and A44-2 are associated with the target object P4, regions A45-1 and A45-2 are associated with the target object P5, regions A46-1 and A46-2 are associated with the target object P6, and regions A47-1 and A47-2 are associated with the target object P7. The regions A41 to A47 are regions concerning gripping of the target object P by the robot 20.

The processing for associating the first region and the second region with the plurality of target objects P is performed according to predetermined operation performed by the operator. The predetermined operation is operation for setting the cursor 2051 to the position of object execution button 3011 and designating (e.g., clicking) the cursor 2051.

Then, the screen 2004 shown in FIG. 8 is displayed. A result of the association processing for the first region and the second region executed on the basis of setting contents of the properties displayed in the property-setting display section 2022 is displayed in the image display section 2021.

In this example, the plurality of target objects P subjected to the association processing are arranged in order from the target object P having the highest degree of similarity (similarity degree) to the first target object.

In the example shown in FIG. 8, processing results of the respective target objects P subjected to the association processing are displayed in the detection-result display section 2023. As the processing results, there are an angle (Angle), an area (Area), a camera X (Camera X), a camera Y (Camera Y), compactness (Compactness), found or not (Found), found on edge (Found On Edge), a hole (Holes), a diameter (Major Diameter), a maximum feret diameter (Max Feret Diameter), a maximum. X coordinate value (Max X), and a maximum. Y coordinate value (Max Y).

Note that, instead of the configuration in which the processing for associating the first region and the second region with the plurality of target objects P is collectively performed according to the predetermined operation performed by the operator, a configuration may be adopted in which association processing for associating the first region with the plurality of target objects P and association processing for associating the second region with the plurality of target objects P are separately performed.

After the processing in S120 is performed, the display control section 363 generates the display image DG, which is an image indicating a third region and a fourth region respectively corresponding to the first region and the second region associated with the target objects P1 to P7 by the associating section 362 and the target objects P1 to P7. The display control section 363 causes the display device 621 to display the generated display image DG (step S130).

Note that, instead of generating the display image DG, which is the image indicating the third region and the fourth region and the target objects P1 to P7, the display control section 363 may be configured to generate the display image DG indicating the first region, the second region, the third region, and fourth region, and the target objects P1 to P7.

The robot control section 364 causes the robot 20 to grip the target object P on the basis of the first region and the second region associated with each of the target objects P1 to P7 (step S140).

The robot control section 364 causes the robot 20 to grip, among the plurality of target objects P included in the image G, the target object P associated with a first region not overlapping the first region associated with another target object P, that is, the target object P, the second region for which associated with the other target object P is associated with the first region not overlapping the first region. As shown in FIG. 8, in this example, the region A31 indicating the first region associated with the target object P1 does not overlap the first regions (i.e., the regions A32 to A37) associated with the target objects P2 to P7, which are the other target objects P. As shown in FIG. 8, in this example, the regions A32 to A37 indicating the first regions associated with the target objects P2 to P7 overlap the first regions of the other target objects P. Therefore, as shown in FIG. 9, among the plurality of target objects P included in the image G1, the target object P associated with the first region not overlapping the first region associated with the other target object P is the target object P1. FIG. 9 is a table showing an example of the target objects P that the robot control device 30 causes the robot 20 to grip. As shown in FIG. 8, in this example, the regions A41-1 to A41-2 indicating the second regions associated with the target object P1 do not overlap the first regions (i.e., the regions A32 to A37) associated with the target objects P2 to P7, which are the other target objects P. As shown in FIG. 8, in this example, some of the regions among A42-1, A42-2, . . . , and A47-2 indicating the second regions associated with the target objects P2 to P7 overlap the first regions of the other target objects P. Therefore, as shown in FIG. 9, among the plurality of target objects P included in the image G1, the target object P, the first region and the second region for which associated with the other target object P are not overlapping the first region, is the target object P1.

Consequently, the robot control section 364 causes the robot 20 to grip the target object P1 among the target objects P1 to P7. Note that the robot control section 364 may be configured to cause the robot 20 to grip the target object P that satisfies at least one of a condition that the target object P is the target object P associated with a first region not overlapping the first region associated with another target object P and a condition that the target object P is the target object P, the second region for which associated with the other target object P is associated with the first region not overlapping the first region.

As explained above, in this example, the first region is the region including the entire contour of the target object P and is the region based on the shape of the target object P. The target object P, the first region for which overlaps, is the target object P that overlaps another target object P. When the robot 20 attempts to grip the target objects P overlapping each other, the end effector E or the target object P is sometimes deteriorated. With the configuration explained above, by causing the robot 20 to grip the target objects P not overlapping each other, the robot control device 30 can suppress the end effector E and the target object P from being deteriorated.

As explained above, in this example, the second region is the region concerning gripping of the target object P. The target object P, the second region for which overlaps the first region of another target object P, is the target object P gripped by the end effector E in a position where the other target object P is present. In the robot 20, when the other target object P is present in the position where the end effector E grips the target object P, the end effector E and the other target object P are sometimes deformed. With the configuration explained above, by causing the robot 20 to grip the target object P gripped by the end effector E in a position where the other target object P is absent, the robot control device 30 can suppress the end effector E and the other target object P from being deformed.

Modification 1: Designation of an Angle of the First Region

A modification 1 of this embodiment is explained with reference to the figures.

Figure 10:
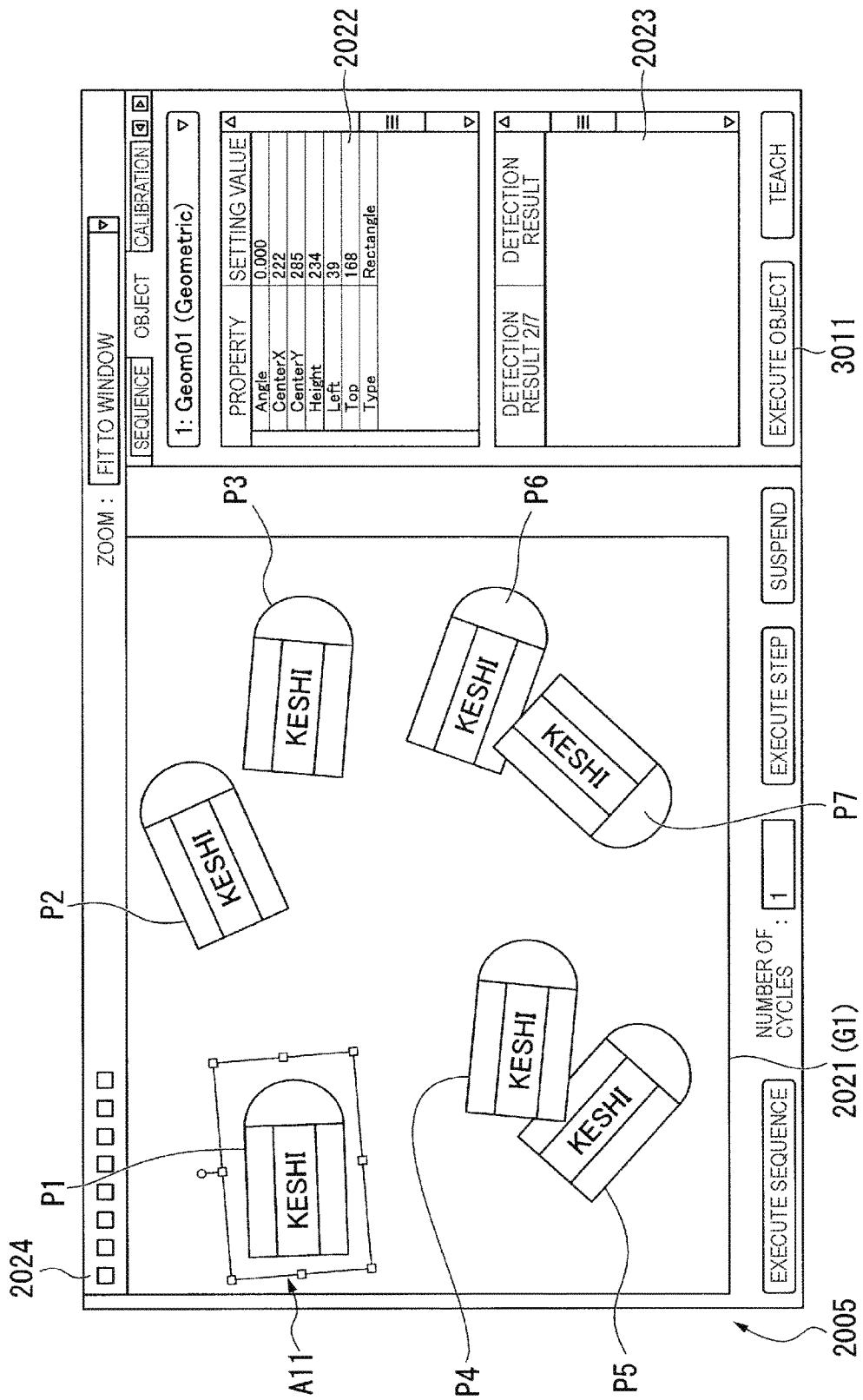
FIG. 10 is a diagram of a specific example 2 of the first region designated for the first target object.

FIG. 10 is a diagram of a specific example 2 of the first region designated for the first target object.

As explained above, the operator of the PC for development 601 designates, on the basis of the image G1 displayed on the display device 621, the first region for the first target object (in this example, the target object P1) among the target objects P included in the image G1. As shown in FIG. 10, in this example, the first region is rectangular. The operator of the PC for development 601 may designate an angle of the first region besides the position and the size of the first region. Specifically, on the basis of the screen 2005 displayed on the display device 621, the operator designates the region A11 as the first region designated for the first target object in the same manner as the configuration explained above and designates an angle (Angle) of the region A11 in the property-setting display section 2022. In this example, in the designation of the angle of the first region, a position where the center of the first region and the center of gravity of the first target object coincide with each other, that is, a position where the longitudinal direction of the rectangle of the first region and the longitudinal direction of the rectangular parallelepiped portion of the first target object are parallel is set as a reference position. An angle from the reference position is designated. Note that the reference position may be a position where the center of the first region and the center of gravity of the first target object coincide with each other, that is, a position where the longitudinal direction of the image G is parallel to the longitudinal direction of the first region and the lateral direction of the image G is parallel to the lateral direction of the first region. As shown in FIG. 10, the operator may designate the angle of the first region by performing operation for rotating the first region in a desired direction.

Figure 11:
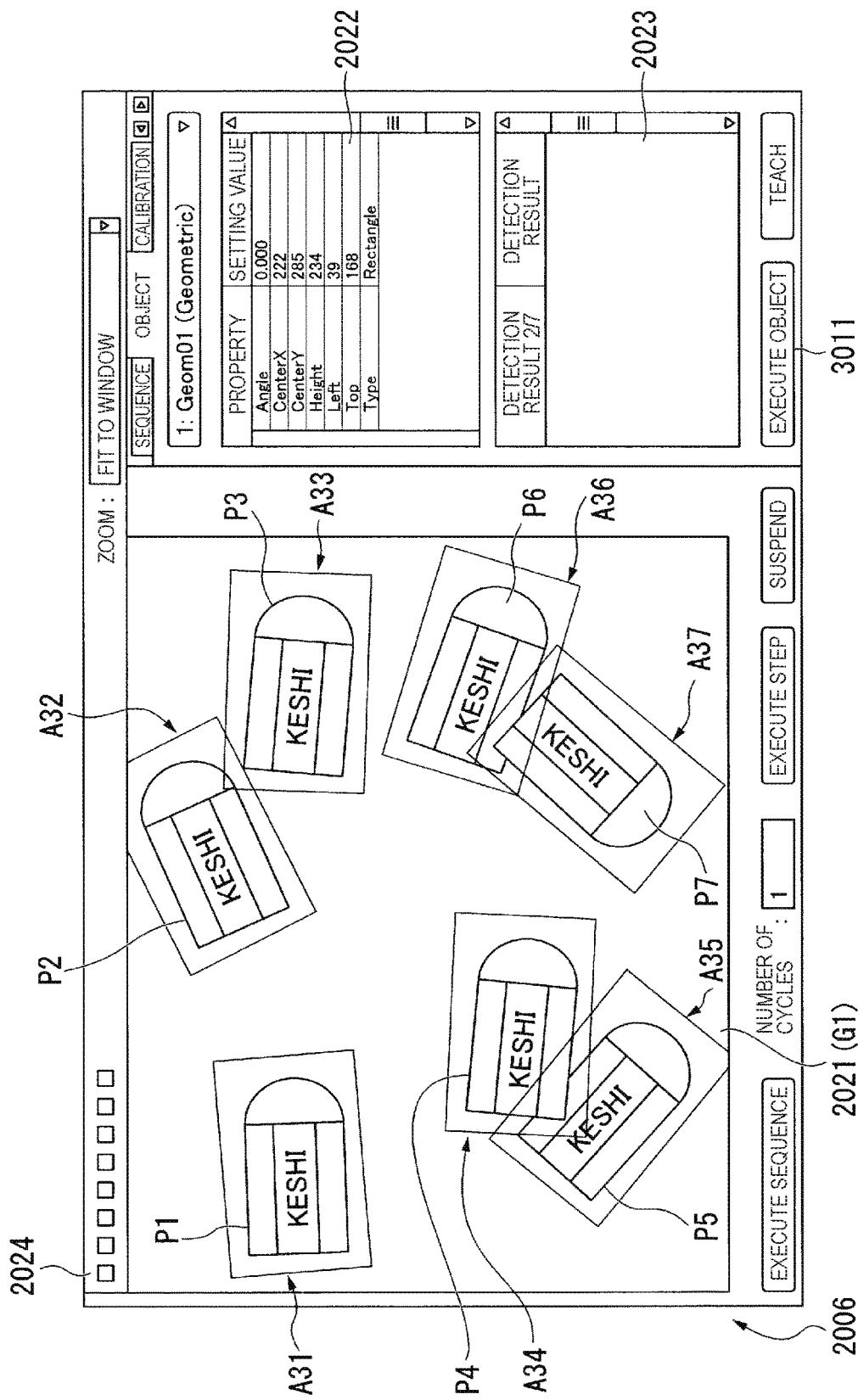
FIG. 11 is a diagram of the specific example 2 of the first region associated with each target objet included in the image.

FIG. 11 is a diagram of the specific example 2 of the first region associated with each of the target objects P included in the image G.

As shown in FIG. 11, on the screen 2006, according to the configuration explained above, the regions A31 to S37, which are the first regions corresponding to the first region shown in FIG. 10, are associated with the target objects P (in this example, the target objects P1 to P2) included in the image G1.

Modification 2: Example of the Shape of the First Region

A modification 2 of this embodiment is explained with reference to the figures.

Figure 12:
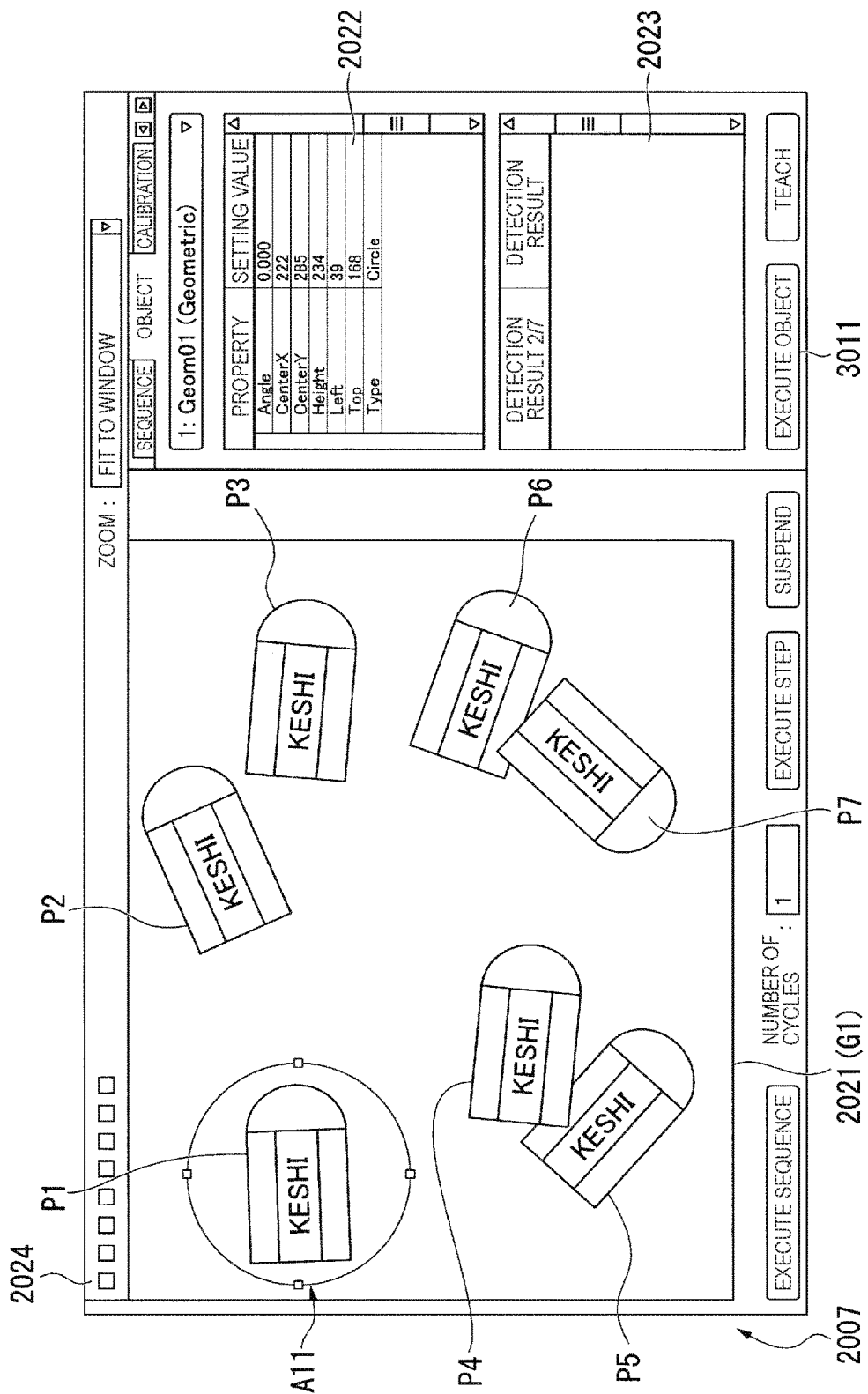
FIG. 12 is a diagram of a specific example 3 of the first region designated for the first target object.

FIG. 12 is a diagram of a specific example 3 of the first region designated for the first target object.

As explained above, the operator of the PC for development 601 designates, on the basis of the image G1 displayed on the display device 621, the first region for the first target object (in this example, the target object P1) among the target objects P included in the image G1. As shown in FIG. 12, in this example, the first region is circular. The operator of the PC for development 601 may designate a shape of the first region besides the position and the size of the first region. Specifically, on the basis of the screen 2007 displayed on the display device 621, the operator designates the region A11 as the first region designated for the first target object and designates a type (Type) of a shape of the region A11 as Circle in the property-setting display section 2022. The operator designates the shape of the first region by inputting information indicating the shape to be designated to the input section IP.

Figure 13:
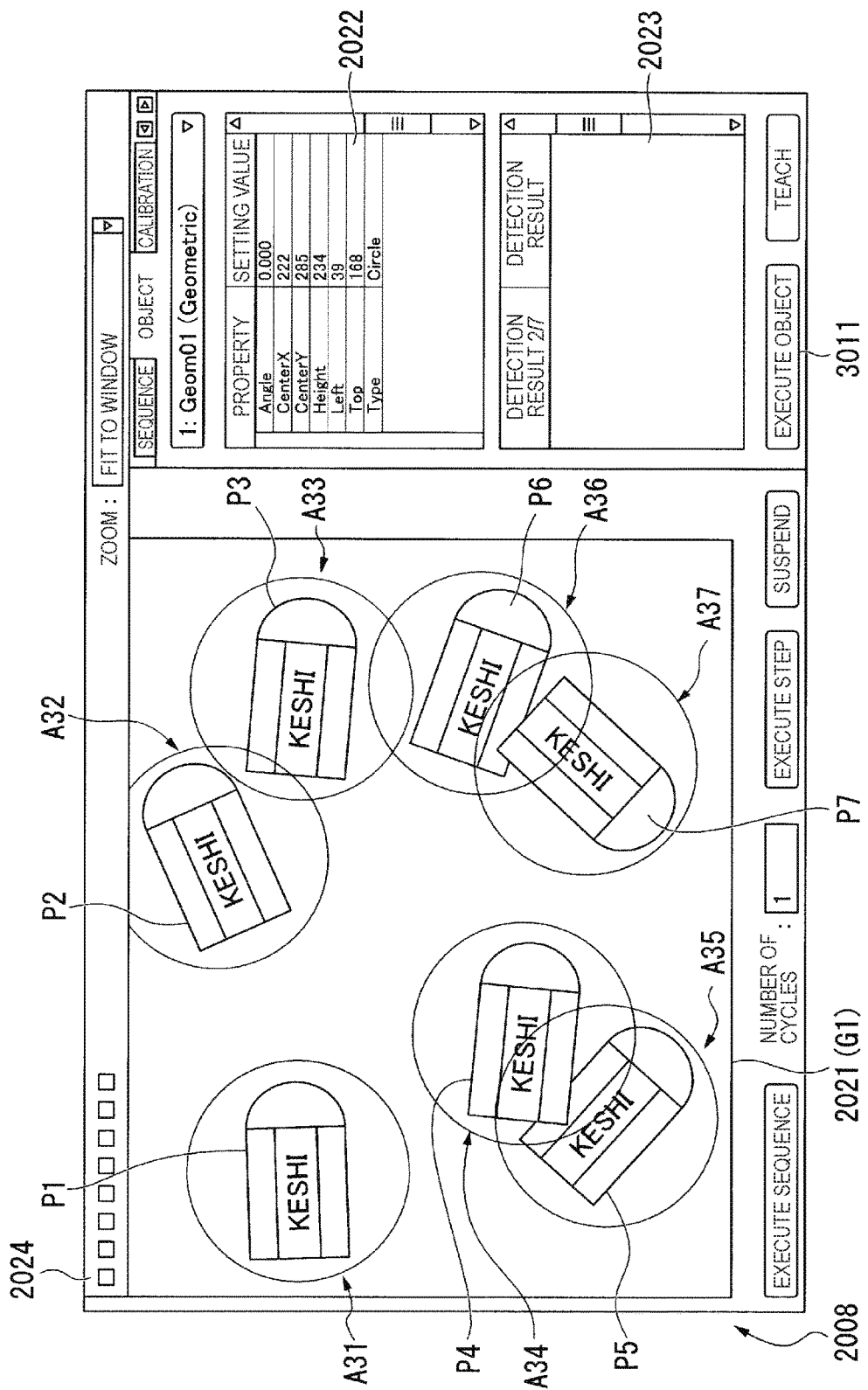
FIG. 13 is a diagram of the specific example 3 of the first region associated with each of the target objects included in the image.

FIG. 13 is a diagram of the specific example 3 of the first region associated with each of the target objects P included in the image G.

As shown in FIG. 13, on the screen 2008, according to the configuration explained above, the regions A31 to A37, which are the first regions corresponding to the first region shown in FIG. 12, are associated with the target objects P (in this example, the target objects P1 and P2) included in the image G1.

Modification 3: Example of the Shape of the First Region

A modification 3 according to this embodiment is explained below with reference to the figures.

Figure 14:
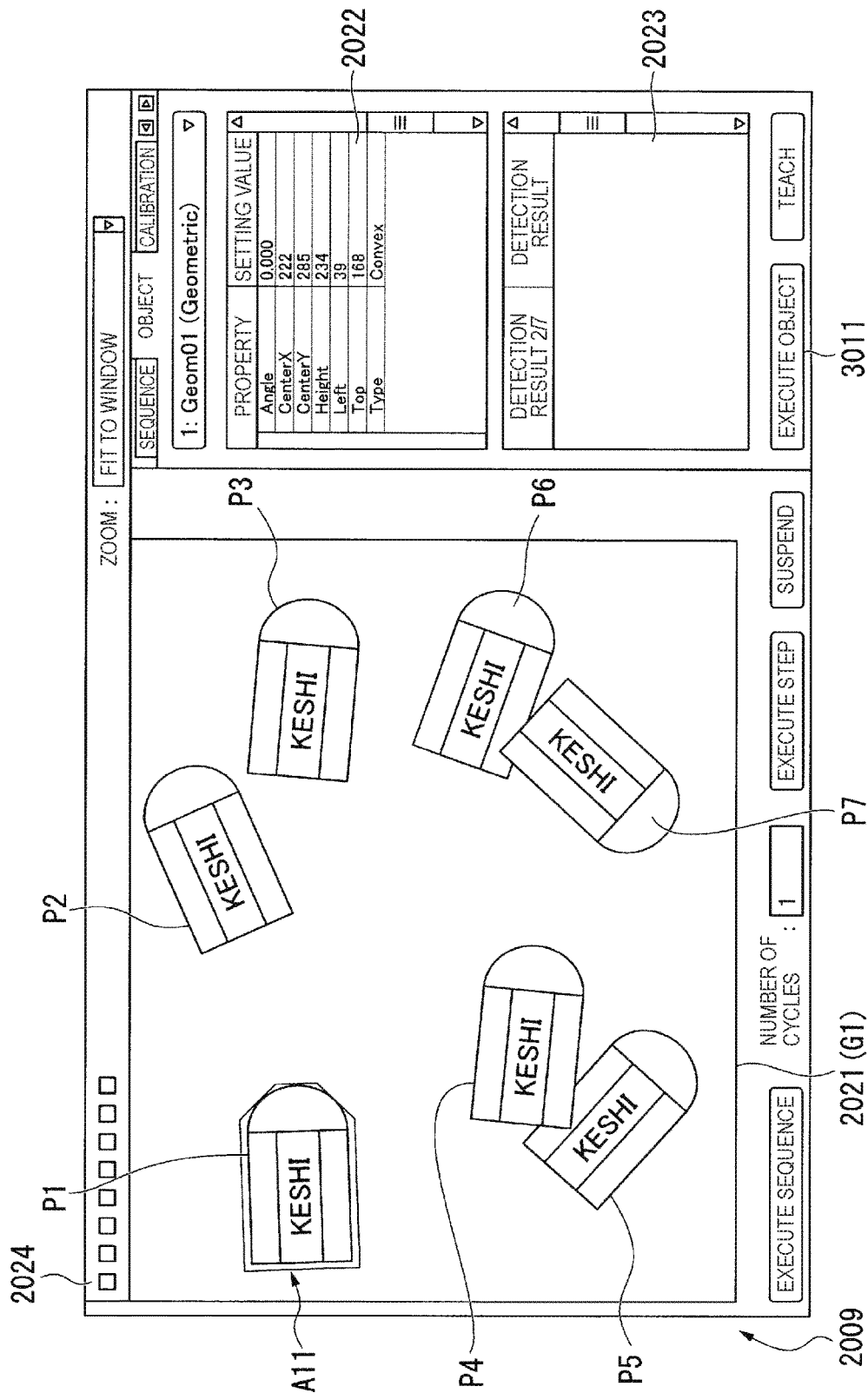
FIG. 14 is a diagram of a specific example 4 of the first region designated for the first target object.

FIG. 14 is a diagram of a specific example 4 of the first region designated for the first target object.

As explained above, on the basis of the image G1 displayed on the display device 621, the operator of the PC for development 601 designates the first region for the first target object (in this example, the target object P1) among the target objects P included in the image G1. As shown in FIG. 14, in this example, the first region is a convex hull in which the first target object is inscribed. Specifically, on the basis of the screen 2009 displayed on the display device 621, the operator designates the region A11 as the first region designated for the first target object and designates a type of a shape (Type) of the region A11 as Convex in the property-setting display section 2022. The operator designates the shape of the first region by inputting information indicating the shape to be designated to the input section IP. Note that, when the operator designates an appropriate region including the first target object, the shape of the first region may be automatically converted into the shape of the convex hull in which the first target object is inscribed.

Figure 15:
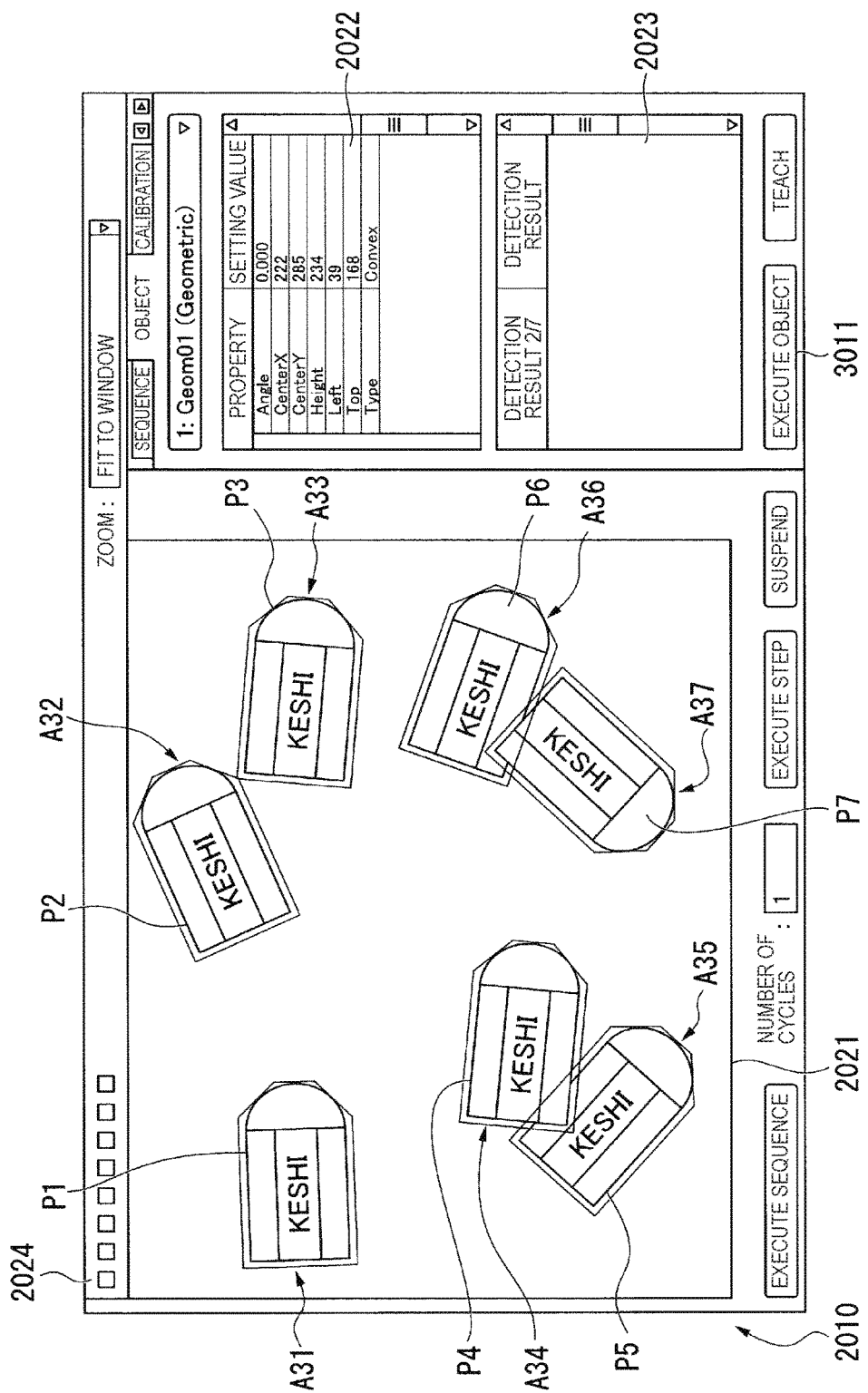
FIG. 15 is a diagram of the specific example 4 of the first region associated with each of the target objects included in the image.

FIG. 15 is a diagram of the specific example 4 of the first region associated with each of the target objects P included in the image G.

AS shown in FIG. 15, on the screen 2010, according to the configuration explained above, the regions A31 to A37, which are the first regions corresponding to the first region shown in FIG. 14, are associated with the target objects P (in this example, the target objects P1 and P2) included in the image G1.

Example of a Hardware Configuration of the Robot System

Figure 16:
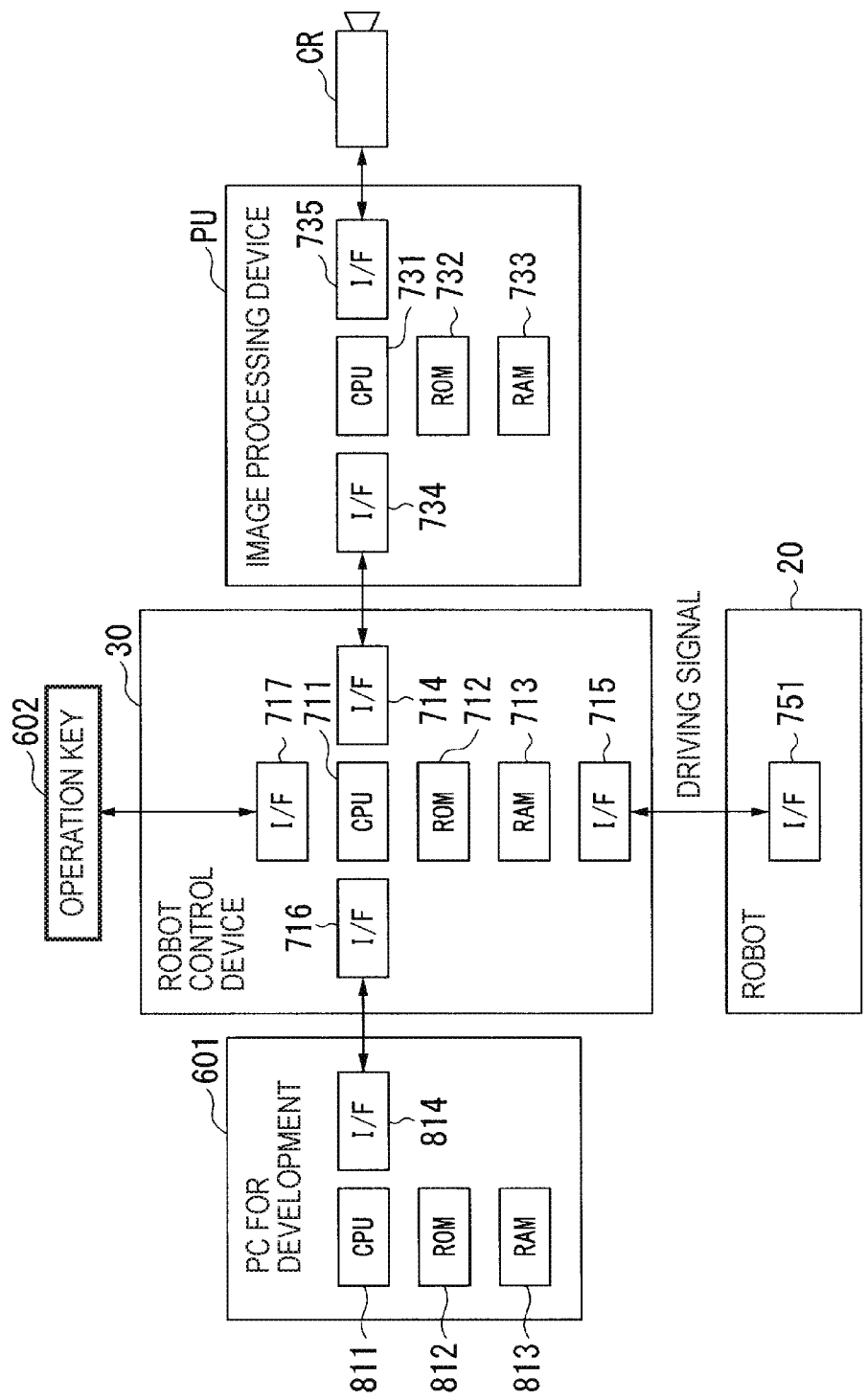
FIG. 16 is a diagram showing an example of hardware configurations of devices in the robot system according to the embodiment.

FIG. 16 is a diagram showing an example of hardware configurations of the devices in the robot system 1 according to this embodiment. Note that, in the example shown in FIG. 16, the display devices DP and 621 and the cables of the display devices DP and 621 shown in FIG. 1 are not shown.

In FIG. 16, the camera CR, the image processing device PU, the robot control device 30, the robot 20, the operation key 602, the PC for development 601, a cable that communicatively connects the camera CR and the image processing device PU, a cable that communicatively connects the image processing device PU and the robot control device 30, a cable that communicatively connects the robot 20 and the robot control device 30, a cable that communicatively connects the PC for development 601 and the robot control device 30, and a cable that communicatively connects the operation key 602 and the robot control device 30 are shown.

The respective cables may be, for example, cables of Ethernet (registered trademark). For example, as a method for connection, a USB (Universal Serial Bus) may be used. The same applies to the other cables.

As an overview of a hardware configuration, the robot control device 30 includes a CUP (Central Processing Unit) 711, a ROM (Read Only Memory) 712, a RAM (Random Access Memory) 713, and four interfaces (I/Fs) 714 to 717.

The four interfaces 714, 715, 716, and 717 are respectively connected to cables.

The robot 20 includes an interface (I/F) 751. The interface 751 is connected to a cable. A driving signal is transmitted from the robot control device 30 to the robot 20 and detection information and the like of a sensor is transmitted from the robot 20 to the robot control device 30 via the cable.

The operation key 602 is separate from the robot control device 30 and receives operation performed by the user. The operation key 602 may include, for example, a key of a switch for instructing execution of processing. The operation key 602 is an example of an I/O (Input/Output) device.

As an overview of a hardware configuration, the image processing device PU includes a CPU 731, a ROM 732, a RAM 733, and two interfaces (I/Fs) 734 and 735.

The two interfaces (I/Fs) 734 and 735 are respectively connected to cables.

As an overview of a hardware configuration, the PC for development 601 includes a CPU 811, a ROM 812, a RAM 813, and an interface (I/F) 814. The interface (I/F) 814 is connected to a cable.

An example of operation performed in the robot system 1 shown in FIG. 16 is explained as operation procedure examples 1 to 6. Note that the example of the operation is an example. Any other operation may be used.

In this embodiment, when a computer program for operating the robot 20 is created, the PC for development 601 is connected to the robot control device 30. However, at a stage of mass production, the PC for development 601 is sometimes disconnected from the robot control device 30.

OPERATION PROCEDURE EXAMPLE 1

The PC for development 601 instructs the image processing device PU to acquire the image G. The image processing device PU acquires the image G according to the instruction. The instruction is relayed by the robot control device 30 between the PC for development 601 and the image processing device PU. The image G is the image G picked up by the camera CR.

OPERATION PROCEDURE EXAMPLE 2

The PC for development 601 sets the first region and the second region on the basis of the acquired image G. For example, the setting may be performed by the user or may be automatically performed by a device (e.g., the PC for development 601). As an example, setting of properties may be performed using the screens 2001 to 2004 shown in FIGS. 5 to 8.

OPERATION PROCEDURE EXAMPLE 3

The PC for development 601 creates, on the basis of setting contents of the first region and the second region, a computer program on which set conditions are reflected and stores (saves) the computer program in the storing section 32 (e.g., the ROM 712) of the robot control device 30.

OPERATION PROCEDURE EXAMPLE 4

The robot control device 30 instructs the image processing device PU to perform the association processing. The image processing device PU performs the association processing according to the instruction.

OPERATION PROCEDURE EXAMPLE 5

The image processing device PU transmits information concerning a result of the association processing to the robot control device 30. Consequently, the robot control device 30 acquires the information concerning the result of the association processing from the image processing device PU.

OPERATION PROCEDURE EXAMPLE 6

The robot control device 30 controls the operation of the robot 20 on the basis of the acquired information concerning the result of the association processing. At this point, the robot control device 30 outputs a direct driving signal to the robot 20. The robot control device 30 acquires information concerning a detection result of a sensor from the robot 20 and performs feedback control or the like according to necessity.

The PC for Development, the Image Processing Device, and the Robot Control Device In this embodiment, the image processing device PU executes predetermined image processing (in this embodiment, processing for designating the first region and the second region in a picked-up image). The PC for development 601 sets conditions of predetermined processing on the basis of information concerning a result of the image processing. The robot control device 30 controls execution of the processing by the robot 20.

Content of the predetermine image processing performed by the image processing device PU is not limited to the content of the image processing in this embodiment. For example, the content of the predetermined image processing may be less or may be more than the content of the image processing in this embodiment and may be different from the content of the image processing in this embodiment. In this case, for example, processing performed by the image processing device PU may be not performed in the PC for development 601 or the robot control device 30. Processing performed by the PC for development 601 or the robot control device 30 may be not performed in the image processing device PU.

In this embodiment, the PC for development 601 performs the control of the processing during the development. However, as another configuration example, all or a part of the functions of the PC for development 601 may be included in the robot control device 30 or the image processing device PU.

That is, if necessary processing is executed in overall processing including the processing performed by the PC for development 601, processing performed by the image processing device PU, and the processing performed by the robot control device 30, allocation of the kinds of processing performed by the respective devices (the PC for development 601, the image processing device PU, and the robot control device 30) may be various.

As an example, the functions of the image processing device PU may be integrated in the robot control device 30. That is, the robot control device 30 may include the functions of the image processing device PU.

In this embodiment, at a development stage of a computer program, for example, all of the association processing, a result of the association processing, and the like are displayed on the display device 621 (the monitor) of the PC for development 601. As a specific example, all of the images (the screens) shown in FIGS. 5 to 8 and FIGS. 10 to 15 are displayed on the display device 621 of the PC for development 601.

Note that the images (the screens) may be auxiliary displayed on the screen of the display device 621 by the image processing device PU.

Modification 4: Single-Arm Robot

A modification 4 of this embodiment is explained below with reference to FIG. 17.

Figure 17:
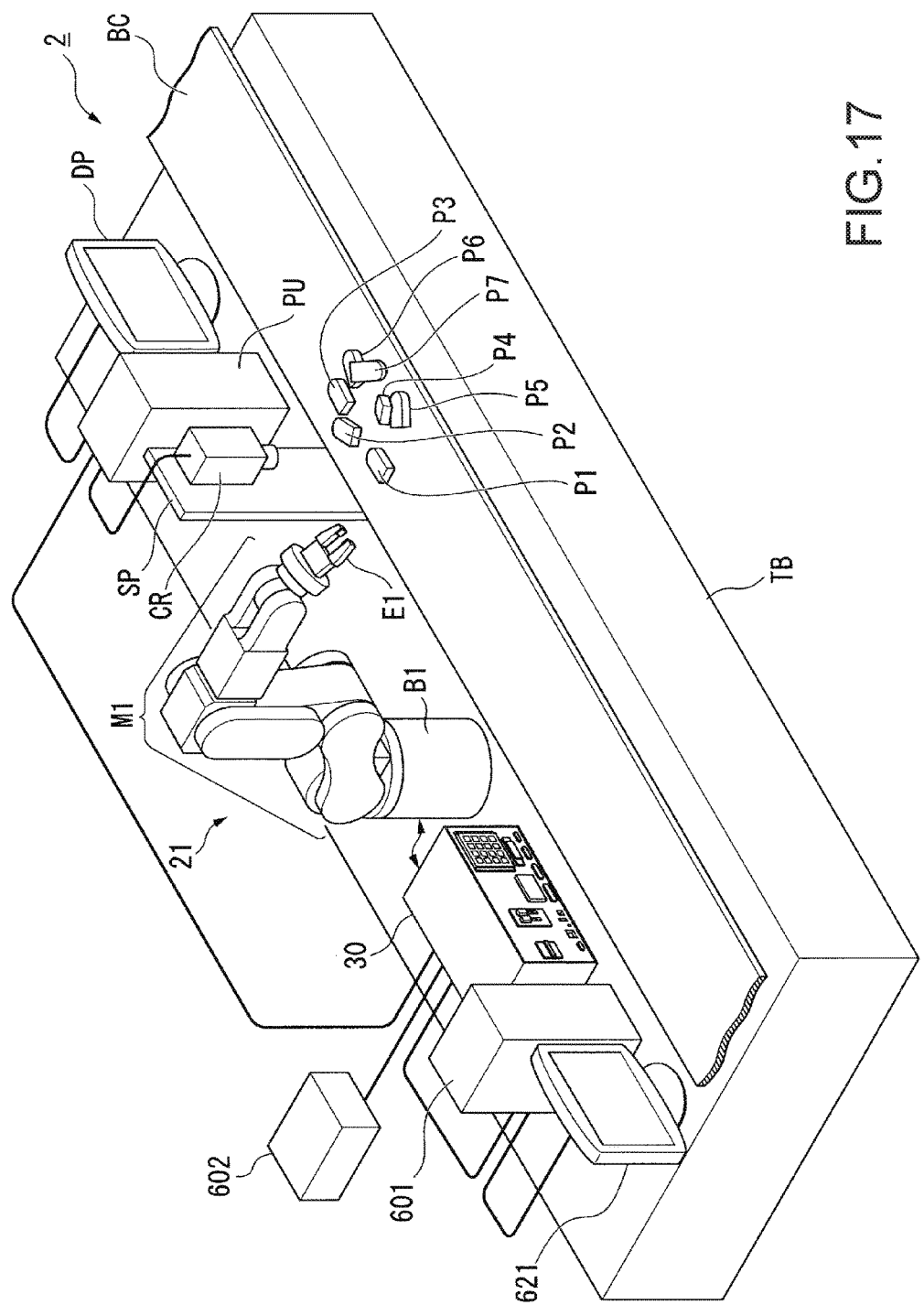
FIG. 17 is a diagram showing an example of the configuration of a robot system according to a modification 4.

FIG. 17 is a diagram showing an example of the configuration of a robot system 2 according to the modification 4.

In the modification 4, a robot 21 included in the robot system 2 is a single-arm robot.

The robot 21 includes a base end (a supporting stand) B1, the manipulator M1, and the end effector E1.

Note that, in the modification 4, the robot control device 30 is provided separately from the robot 21. As another configuration example, the robot control device 30 may be provided integrally with the robot 21. For example, the robot control device 30 may be provided on the inside of the base end B1 of the robot 21.

The base end B1 of the robot 21 is set on the table TB.

One end of the manipulator M1 of the robot 21 is connected to the base end B1. The other end of the manipulator M1 of the robot 21 and the end effector E1 are connected.

The manipulator M1 of the robot 21 has a structure of a six-axis vertical multi-joint type and includes six joints. The respective joints include actuators (not shown in the figure). The robot 21 performs a six-axis degree-of-freedom operation according to the operations of the respective actuators of the six joints. As another configuration example, in the robot system 2, a robot that performs operation at a degree of freedom or five or less axes or a robot that performs operation at a degree of freedom of seven or more axes may be used.

The end effector E1 of the robot 21 is, for example, a hand and includes a finger section capable of gripping an object. As another configuration example, the end effector E1 of the robot 21 may be any end effector. The end effector E1 may be, for example, an end effector that attracts an object using suction of the air or an end effector that attracts an object using a magnetic force.

The robot control device 30 controls the robot 21 according to an operation control program set in advance. For example, the robot control device 30 teaches the robot 21 (a main body) various kinds of information necessary for realizing the operation of the robot 21. Specifically, the robot control device 30 controls the respective actuators included in the manipulator M1 and the end effector E1.

The robot control device 30 performs, on the robot 21, control same as the control for causing the robot 20 to grip the target object P and causes the robot 21 to perform predetermined work.

Modification 5: Dual-Arm Robot

A modification 5 of this embodiment is explained below with reference to FIG. 18.

Figure 18:
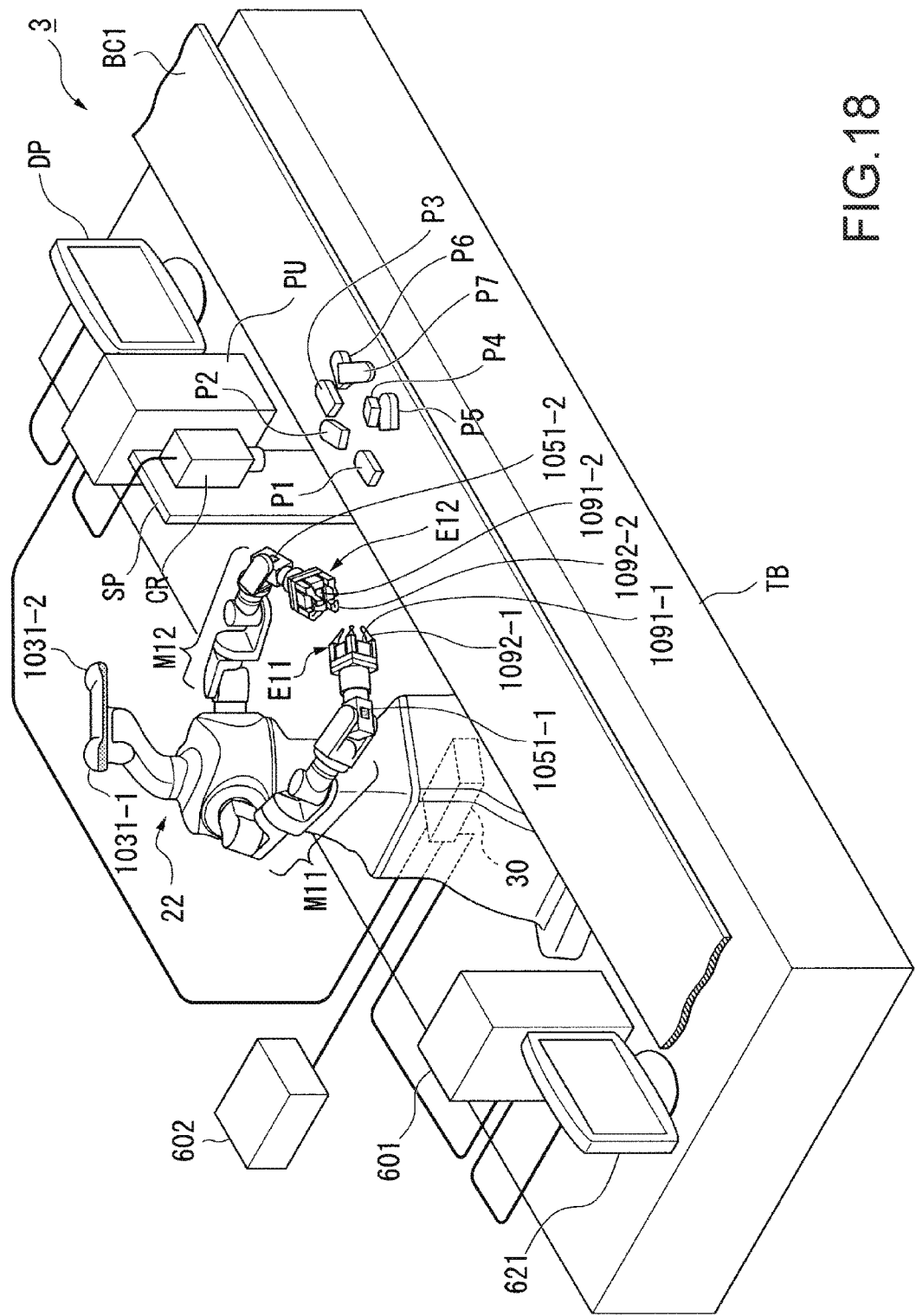
FIG. 18 is a diagram showing an example of the configuration of a robot system according to a modification 5.

FIG. 18 is a diagram showing an example of the configuration of a robot system 3 according to the modification 5.

In the modification 5, a robot 22 included in the robot system 3 is a dual-arm robot.

The robot 22 includes a head section present in an upper part, a trunk section present in a center part, a stand section (a portion of a stand) present in a lower part, and arm sections provided in the trunk section.

The robot 22 is a dual-arm robot including two arms as the arm sections.

As a configuration on one arm side, the robot 22 includes a first manipulator M11 and a first end effector E11.

As a configuration on the other arm side, the robot 22 includes a second manipulator M12 and a second end effector E12.

In the modification 5, with the configuration on one arm side (the first manipulator M11 to which the first end effector E11 is attached), it is possible to perform a seven-axis degree-of-freedom operation. With the configuration on the other arm side (the second manipulator M12 to which the second end effector E12 is attached), it is possible to perform a seven-axis degree-of-freedom operation. However, as another configuration example, a configuration for performing operation at a degree of freedom of six or less axes or eight or more axes may be used.

When operating at a degree of freedom of seven axes, the first manipulator M11 and the second manipulator M12 can take more postures and, therefore, operate more smoothly compared with when operating at a degree of freedom of six or less axes. It is possible to easily avoid interference with objects present around the first manipulator M11 and the second manipulator M12. When the first manipulator M11 and the second manipulator M12 operate at a degree of freedom of seven axes, it is easier to control the first manipulator M11 and the second manipulator M12 because computational complexity is less compared with when the first manipulator M11 and the second manipulator M12 operate at a degree of freedom of eight or more axes. Because of such reasons, in the modification 5, the first manipulator M11 and the second manipulator M12 that operate at a degree of freedom of seven axes are used as a preferred example.

In the modification 5, the trunk section is capable of turning at a degree of freedom of one axis in the portion of the waist.

The robot 22 includes two cameras (a first camera 1031-1 and a second camera 1031-2) respectively provided on the left and the right of the head section, a camera (a third camera 1051-1) provided in a predetermined part of the first manipulator M11, and a camera (a fourth camera 1051-2) provided in a predetermined part of the second manipulator M12.

The respective cameras (the first camera 1013-1, the second camera 1031-2, the third camera 1051-1, and the fourth camera 1051-2) are, for example, cameras including a CCD (Charge Coupled Device) or a CMOS (Complementary Metal Oxide Semiconductor).

The first camera 1031-1 and the second camera 1031-2 are moved according to the movement of the head section.

The third camera 1051-1 and the fourth camera 1051-2 are respectively moved according to the movements of the first manipulator M11 and the second manipulator M12.

The robot 22 includes the robot control device 30. In the modification 5, the robot 22 includes the robot control device 30 on the inside of the stand section.

The robot control device 30 controls the operation of the robot 22. The robot control device 30 controls, for example, the operations of the first manipulator M11 and the second manipulator M12. Further, in a configuration in which the operations of portions such as the waist of the robot 22 are possible, the robot control device 30 controls the operations of the portions such as the waist.

In the modification 5, each of the first camera 1031-1, the second camera 1031-2, the third camera 1051-1, and the fourth camera 1051-2 picks up an image and transmits (outputs) information concerning the picked-up image to the robot control device 30.

In the modification 5, calibration of a coordinate system is performed concerning the position and the posture of the first manipulator M11, the position and the posture of the second manipulator M12, and images picked up by the cameras (the first camera 1031-1, the second camera 1031-2, the third camera 1051-1, and the fourth camera 1051-2).

In the modification 5, the robot control device 30 controls the operation of the robot 22 according to an operation control program set in advance. The robot control device 30 teaches the robot 22 (the main body) various kinds of information necessary for realizing the operation of the robot 22.

As a specific example, the robot control device 30 is capable of causing the end effectors (the first end effector E11 and the second end effector E12) to grip an object by controlling the operations of the manipulators (the first manipulator M11 and the second manipulator M12). The robot control device 30 is also capable of causing the end effectors to move the gripped object, placing the object gripped by the end effectors in a predetermined position and releasing the object (releasing the grip), and machining (e.g., boring) the object gripped by the end effectors.

In the modification 5, the respective end effectors E11 and E12 include palms 1091-1 and 1091-2 and claws (fingers) 1092-1 and 1092-2.

In the modification 5, the robot control device 30 is capable of controlling either one of the two manipulators M11 and M12 and is capable of cooperatively controlling both of the two manipulators M11 and M12.

Note that, in the modification 5, for example, instead of the camera CR, one or more of the plurality of cameras 1031-1, 1031-2, 1051-1, and 1051-2 may be used.

The robot control device 30 performs, on the robot 22, control same as the control for causing the robot 20 to grip the target object P and causes either one or both of the first end effector E11 and the second end effector E12 to grip the target object P.

Note that, in the above explanation, the robot control device 30 performs, on the basis of the image G picked up by the camera CR, the control for causing the end effector to grip the target object P. However, the robot control device 30 is not limited to this. The robot control device 30 may three-dimensionally measure the target object P and designate the first region and the second region for the first target object on the basis of a result of the measurement.

As explained above, on the basis of the received first region information indicating the first region, which is the region designated for the acquired picked-up image G of the plurality of target objects P, and the second region information indicating the second region different from the first region and corresponding to the first region, the robot control device 30 causes the robot to grip the target object P for which the second region not overlapping the first region of another target object P is designated and does not cause the robot to grip the target object P, the second region for which overlaps the first region of the other target object P. Consequently, the robot control device 30 can cause the robot to grip the target object P that satisfies a condition desired by the operator.

On the basis of the first region information, the robot control device 30 causes the robot to grip the target object P for which the first region not overlapping the first region designated for another target object P is designated and does not cause the robot to grip the target object P for which the first region overlapping the first region designated for the other target object P is designated. Consequently, on the basis of the first region associated with the target object P, the robot control device 30 can cause the robot to grip the target object P that satisfies a condition desired by the operator.

In the robot control device 30, the second region is set according to the designation of the first region. Consequently, the robot control device 30 can assist the setting of the second region.

In the robot control device 30, the second region is designated by the received operation. Consequently, the robot control device 30 can designate, in the target object P, the second region desired by the operator.

The robot control device 30 sets the third region corresponding to the first region and the fourth region corresponding to the second region in the image G of at least a part of the plurality of target objects P on the basis of the first region information and the second region information and causes the display section (in this example, the display device 621 or the display device DP) to display the third region and the fourth region and at least the part of the target objects P for which the third region and the fourth region are set. Consequently, the robot control device 30 can assist the operator in designating the first region and the second region in the target object P.

The robot control device 30 causes the display section to display the first region indicated by the first region information and the second region indicated by the second region information and the image G of the target object P. Consequently, the robot control device 30 can assist the operator in associating the first region and the second region with the target object P.

In the robot control device 30, the first region is the region including the entire contour of the target object P and is the region based on the shape of the target object P. Consequently, on the basis of the first region including the entire target object P, the robot control device 30 can cause the robot to grip the target object P that satisfies a condition desired by the operator.

In the robot control device 30, the shape of the first region is the convex hull. Consequently, on the basis of the first region corresponding to the first region having the convex hull shape, the robot control device 30 can cause the robot to grip the target object P that satisfies a condition desired by the operator.

In the robot control device 30, the second region is the region concerning the gripping of the target object P by the robot. Consequently, on the basis of the second region concerning the gripping, the robot control device 30 can cause the robot to grip the target object P that satisfies a condition desired by the operator.

The robot 20 grips the target object P on the basis of the first region and the second region. Consequently, the robot 20 can grip the target object P that satisfies a condition desired by the operator.

The robot system 1 causes the robot 20 to grip the target object P on the basis of the first region and the second region.

Consequently, the robot system 1 can cause the robot 20 to grip the target object P that satisfies a condition desired by the operator.

The embodiment of the invention is explained in detail above with reference to the drawings. However, a specific configuration is not limited to the embodiment and may be, for example, changed, substituted, or deleted without departing from the spirit of the invention.

It is also possible to record, in a computer-readable recording medium, a computer program for realizing functions of any components in the devices (e.g., the robot control device 30) explained above, cause a computer system to read the computer program, and execute the computer program. Note that the "computer system" includes an OS (an operating system) and hardware such as peripheral devices. The "computer-readable recording medium" refers to a portable medium such as a flexible disk, a magneto-optical disk, a ROM, or a CD (Compact Disk)-ROM or a storage device such as a hard disk incorporated in the computer system. Further, the "computer-readable recording medium" includes a recording medium that stores a computer program for a fixed time such as a volatile memory (a RAM) inside a computer system functioning as a server or a client when a computer program is transmitted via a network such as the Internet or a communication line such as a telephone line.

The computer program may be transmitted from a computer system, which stores the computer program in a storage device or the like, to another computer system via a transmission medium or by a transmission wave in the transmission medium. The "transmission medium", which transmits the computer program, refers to a medium having a function of transmitting information like a network (a communication network) such as the Internet or a communication line (a communication wire) such as a telephone line.

The computer program may be a computer program for realizing a part of the functions explained above. Further, the computer program may be a computer program that can realize the functions in a combination with a computer program already recorded in the computer system, a so-called differential file (a differential program).

The entire disclosure of Japanese Patent Application No. 2016-168976, filed Aug. 31, 2016 is expressly incorporated by reference herein.

What is claimed is:

1. A robot control device comprising:
   a memory configured to store computer-executable instructions; and
   a processor configured to execute the computer-executable instructions so as to control a robot,
   wherein the processor is configured to:
      cause a camera to capture an image including a plurality of target objects;
      designate a first region with respect to each of the plurality of target objects in the captured image, the first region surrounding a periphery of each of the plurality of target objects;
      designate two second regions with respect to each of the plurality of target objects in the captured image, each of the two second regions being different from the first region, the two second regions being located directly adjacent to each of the plurality of target objects and partially overlapped with the first region;
      determine whether each target object among the plurality of the target objects has a first condition in which the two second regions of one of the plurality of target objects are spaced apart from the first region of each of the other of the plurality of target objects in the captured image; and
      cause the robot to grip the target object among the plurality of target objects that has the determined first condition.

2. The robot control device according to claim 1, wherein the processor is further configured to:
   determine whether each target object among the plurality of the target objects has a second condition in which the first region of one of the plurality of target objects is spaced apart from the first region of each of the other of the plurality of target objects in the captured image; and
   cause the robot to grip the target object among the plurality of target objects that has the determined second condition.

3. The robot control device according to claim 1, wherein the two second regions are set according to the designation of the first region.

4. The robot control device according to claim 1, wherein the two second regions are designated by a received operation.

5. The robot control device according to claim 1, wherein the processor is configured to set a third region and a fourth region with respect to at least one of the plurality of target objects in the captured image, and the third and fourth regions correspond to the first two second regions, respectively and
the processor is configured to display the at least one of the plurality of target objects having the first region, the two second regions, the third region, and the fourth region onto a display.

6. The robot control device according to claim 1, wherein the processor is configured to display the plurality of target objects in which each target object having the first region and the two second regions onto a display.

7. The robot control device according to claim 1, wherein the first region is designated based on a shape of each of the plurality of target objects.

8. The robot control device according to claim 1, wherein a shape of the first region is a convex hull.

9. The robot control device according to claim 1, wherein the two second regions correspond to a required region for a gripping operation of each of the plurality of target objects by the robot.

10. A robot system comprising:
    a robot handling a plurality of target objects;
    a camera configured to capture an image of the plurality of target objects; and
    a robot control device, the robot control device having:
       a memory configured to store computer-executable instructions; and
       a processor configured to execute the computer-executable instructions so as to control the robot,
    wherein the processor is configured to:
       cause the camera to capture the image including the plurality of target objects;
       designate a first region with respect to each of the plurality of target objects in the captured image, the first region surrounding a periphery of each of the plurality of target objects;
       designate two second regions with respect to each of the plurality of target objects in the captured image, each of the two second regions being different from the first region, the two second regions being located directly adjacent to each of the plurality of target objects and partially overlapped with the first region;

determine whether each target object among the plurality of the target objects has a first condition in which the two second regions of one of the plurality of target objects are spaced apart from the first region of each of the other of the plurality of target objects in the captured image; and cause the robot to grip the target object among the plurality of target objects that has the determined first condition.

11. The robot system according to claim 10, wherein the processor is further configured to:

determine whether each target object among the plurality of the target objects has a second condition in which the first region of one of the plurality of target objects is spaced apart from the first region of each of the other of the plurality of target objects in the captured image; and cause the robot to grip the target object among the plurality of target objects that has the determined second condition.

12. The robot system according to claim 10, wherein the two second regions are set according to the designation of the first region.

13. The robot system according to claim 10, wherein the two second regions are designated by a received operation.

14. The robot system according to claim 10, wherein the processor is configured to set a third region and a fourth region with respect to at least one of the plurality of target objects in the captured image, and the third and fourth regions correspond to the first two second regions, respectively and the processor is configured to display the at least one of the plurality of target objects having the first region, the two second regions, the third region, and the fourth region onto a display.

15. The robot system according to claim 10 future comprising a display, wherein the processor is configured to display the plurality of target objects in which each target object having the first region and the two second regions onto the display.

16. The robot system according to claim 10, wherein the first region is designated based on a shape of each of the plurality of target objects.

17. The robot system according to claim 10, wherein a shape of the first region is a convex hull.

18. The robot system according to claim 10, wherein the two second regions correspond to a required region for a gripping operation of each of the plurality of target objects by the robot.

19. A robot comprising:

an end effector configured to grip one of a plurality of target objects;

a camera configured to capture an image of the plurality of target objects; and a robot control device, the robot control device having:
    a memory configured to store computer-executable instructions; and
    a processor configured to execute the computer-executable instructions so as to control the robot, wherein the processor is configured cause the camera capture the image including the plurality of target objects;

designate a first region with respect to each of the plurality of target objects in the captured image, the first region surrounding a periphery of each of the plurality of target objects;

designate two second regions with respect to each of the plurality of target objects in the captured image, each of the two second regions being different from the first region, the two second regions being located directly adjacent to each of the plurality of target objects and partially overlapped with the first region;

determine whether each target object among the plurality of the target objects has a first condition in which the two second regions of one of the plurality of target objects are spaced apart from the first region of each of the other of the plurality of target objects in the captured image; and cause the end effector to grip the target object among the plurality of target objects that has the determined first condition.

20. The robot according to claim 19, wherein the processor is further configured to:

determine whether each target object among the plurality of the target objects has a second condition in which the first region of one of the plurality of target objects is spaced apart from the first region of each of the other of the plurality of target objects in the captured image; and cause the end effector to grip the target object among the plurality of target objects that has the determined second condition.

* * * * *